United States Patent [19]
Vandebroek et al.

[11] Patent Number: 5,249,141
[45] Date of Patent: Sep. 28, 1993

[54] METHOD AND APPARATUS FOR MAINTAINING AN ACTIVE DEVICE BELOW A MAXIMUM SAFE OPERATING TEMPERATURE

[75] Inventors: Bart C. Vandebroek, Geneva; Anthony R. Keane, Webster, both of N.Y.

[73] Assignee: Astec America, Inc., Oceanside, Calif.

[21] Appl. No.: 602,476

[22] Filed: Oct. 24, 1990

[51] Int. Cl.$^5$ .............. H02H 5/00; H02H 3/00; G06F 15/56
[52] U.S. Cl. .................. 364/557; 324/71.1; 361/103; 364/480; 364/579
[58] Field of Search .......... 364/550, 557, 579, 578, 364/480, 481, 483; 330/207 P; 361/103, 105, 106, 124; 357/43; 374/100, 134, 141, 178; 324/71.1

[56] References Cited

U.S. PATENT DOCUMENTS

| | | | |
|---|---|---|---|
| 3,622,849 | 11/1971 | Kelley, Jr. et al. | 361/103 X |
| 4,001,649 | 1/1977 | Young | 361/103 X |
| 4,052,744 | 10/1977 | Boothman et al. | 361/103 |
| 4,053,996 | 10/1977 | Schertz et al. | 361/103 X |
| 4,054,845 | 10/1977 | Glogolja et al. | 361/103 X |
| 4,117,527 | 9/1978 | Demarest et al. | 361/103 |
| 4,727,450 | 2/1988 | Fachinetti et al. | 361/103 |
| 4,779,161 | 10/1988 | DeShazo, Jr. | 361/103 |
| 4,787,007 | 11/1988 | Matsumura et al. | 361/103 |
| 4,903,106 | 2/1990 | Fukunaga et al. | 357/43 |
| 5,008,771 | 4/1991 | Palara | 361/103 |
| 5,050,114 | 9/1991 | Lee | 364/578 |
| 5,057,962 | 10/1991 | Alley et al. | 361/103 X |

*Primary Examiner*—Kevin J. Teska
*Attorney, Agent, or Firm*—McCubbrey, Bartels, Meyer & Ward

[57] ABSTRACT

The present invention relates to the protection of a semiconductor active device from thermal breakdown without actually measuring the temperature of the semiconductor active device. Instead, the present invention measures the magnitude of the forward electrical signal generated by the active device and the reflected electrical signal resulting from the interaction of the forward electrical signal and a load. The thermal energy generated by the active device is a function of these electrical signals. The generated thermal energy is transferred out of the active device at a predetermined rate. The temperature of the active device is calculated as a function of the thermal energy generated by the active device and the amount of thermal energy transferred out of the active device. When the calculated temperature is above a predetermined value, the active device is shut off, thereby preventing further generation of thermal energy.

17 Claims, 9 Drawing Sheets

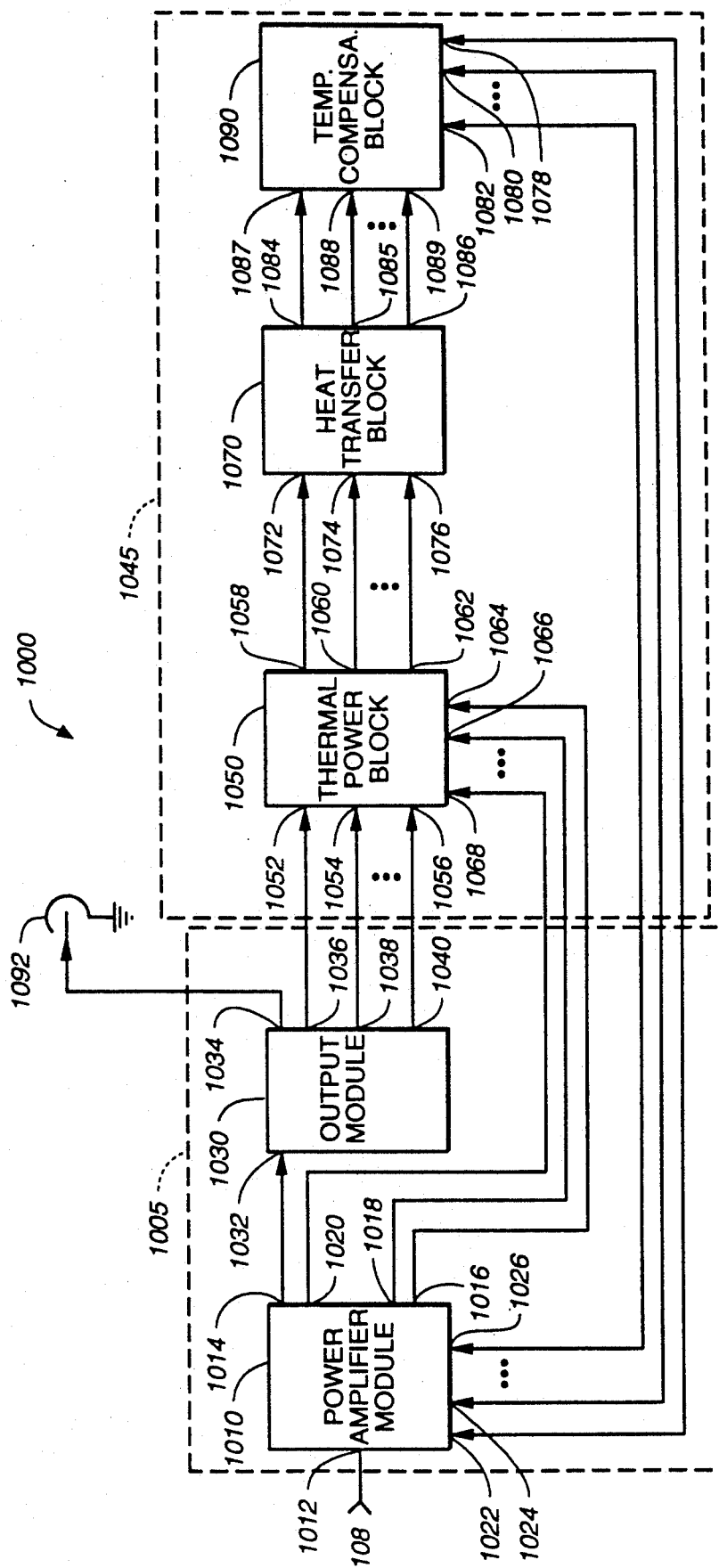
FIG._1

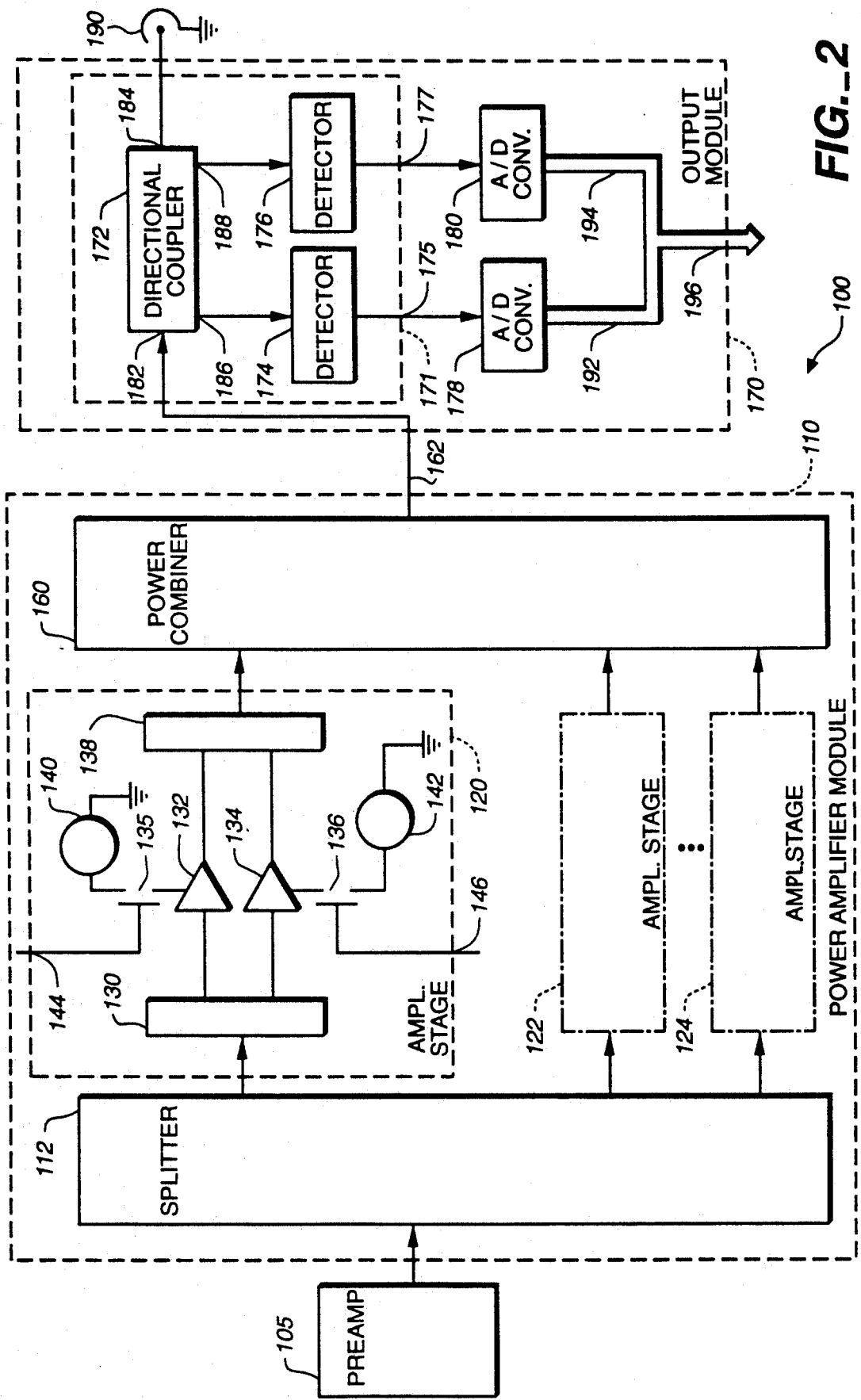
FIG._2

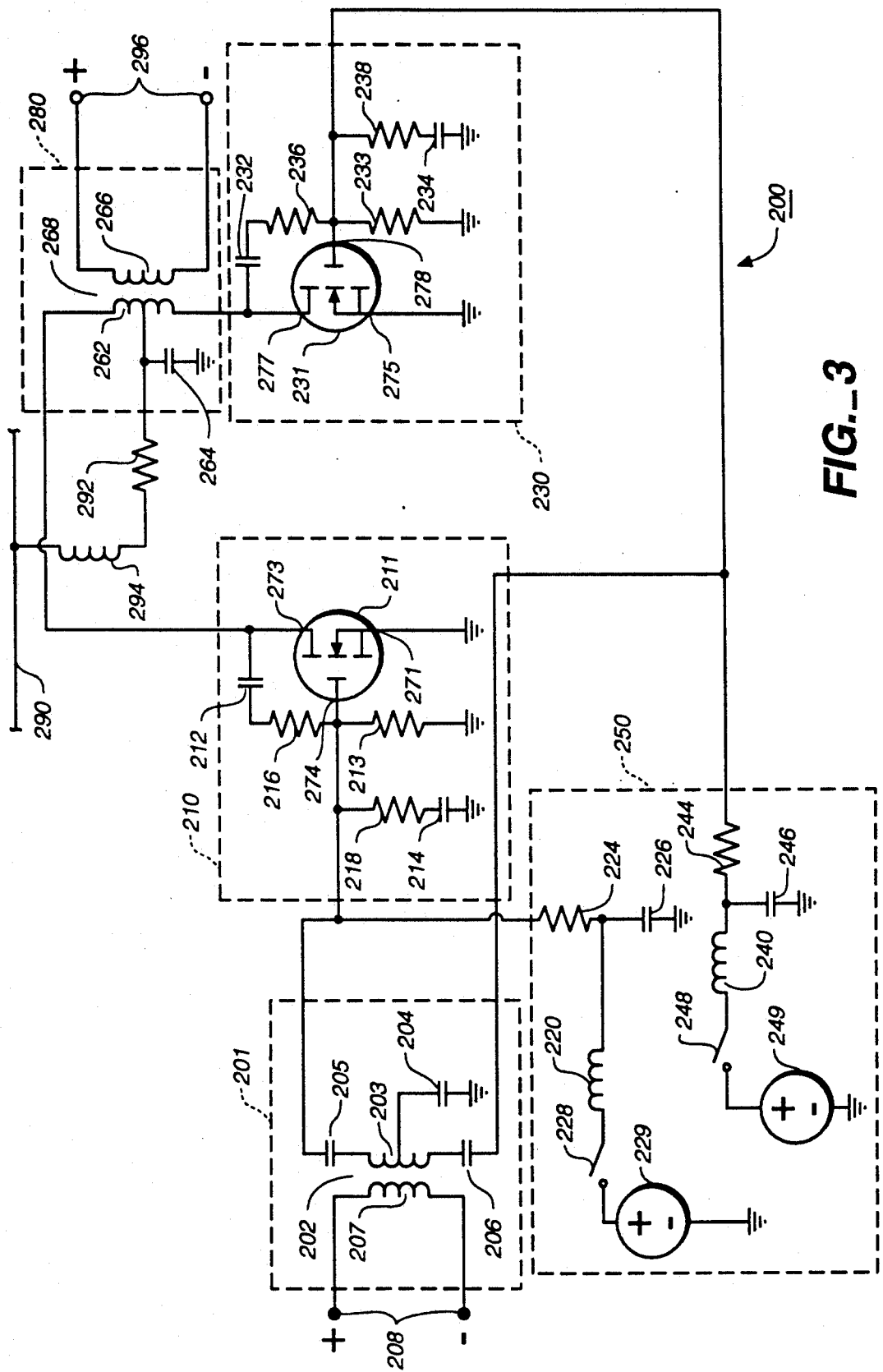
FIG._3

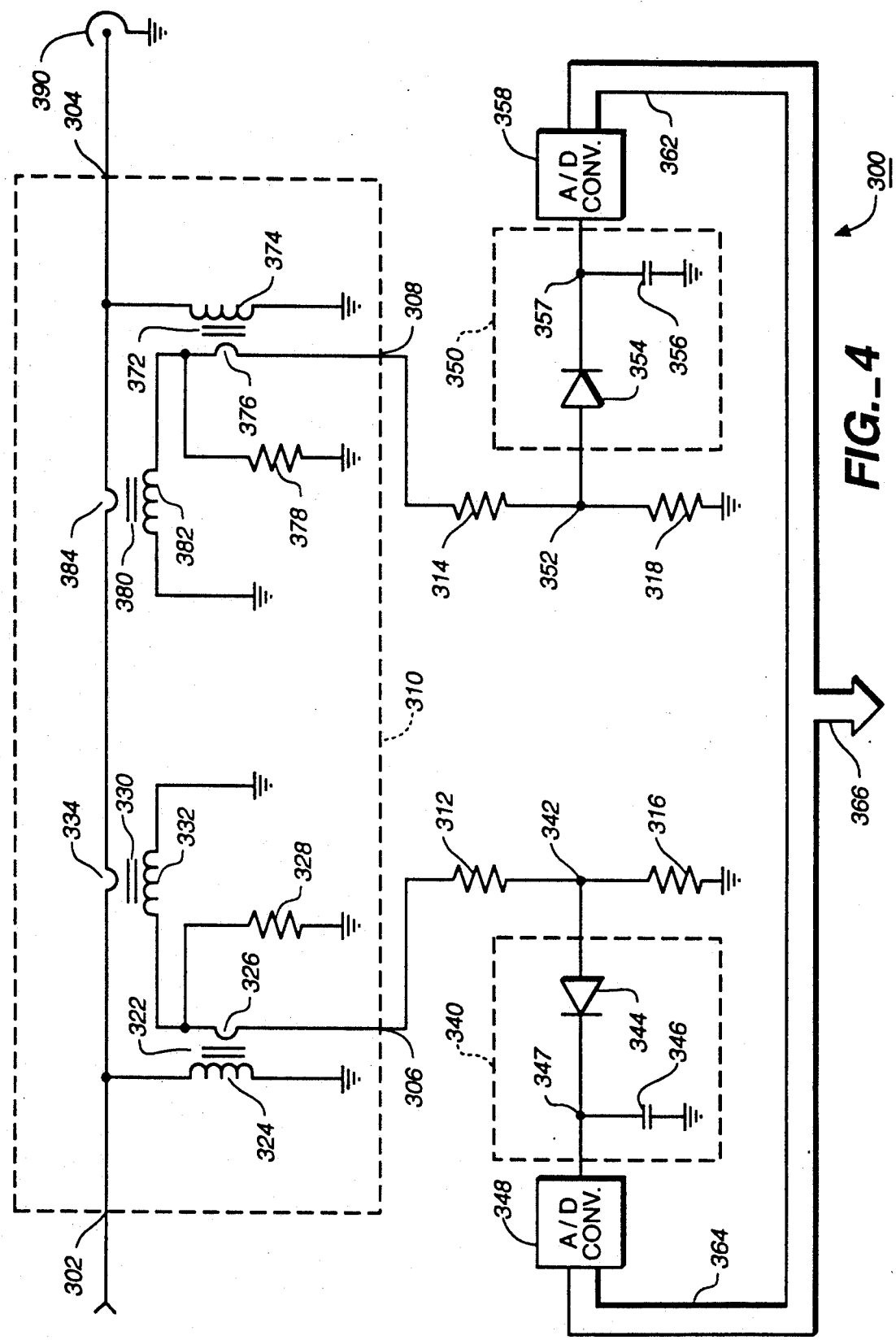
FIG._4

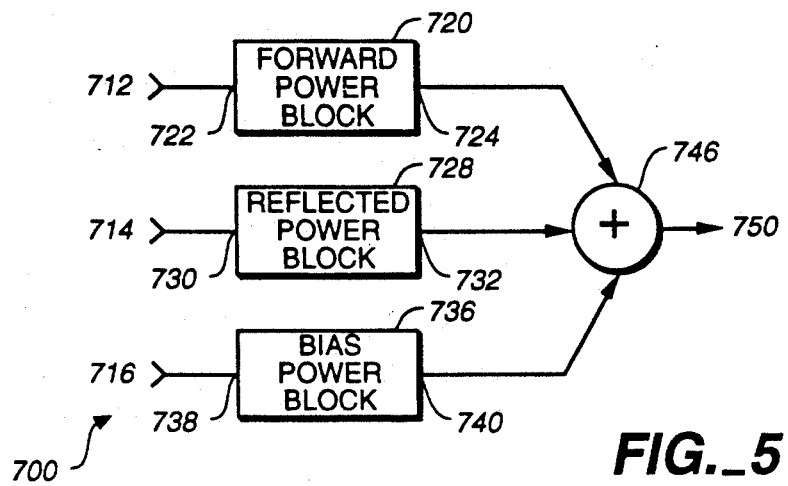
FIG._5
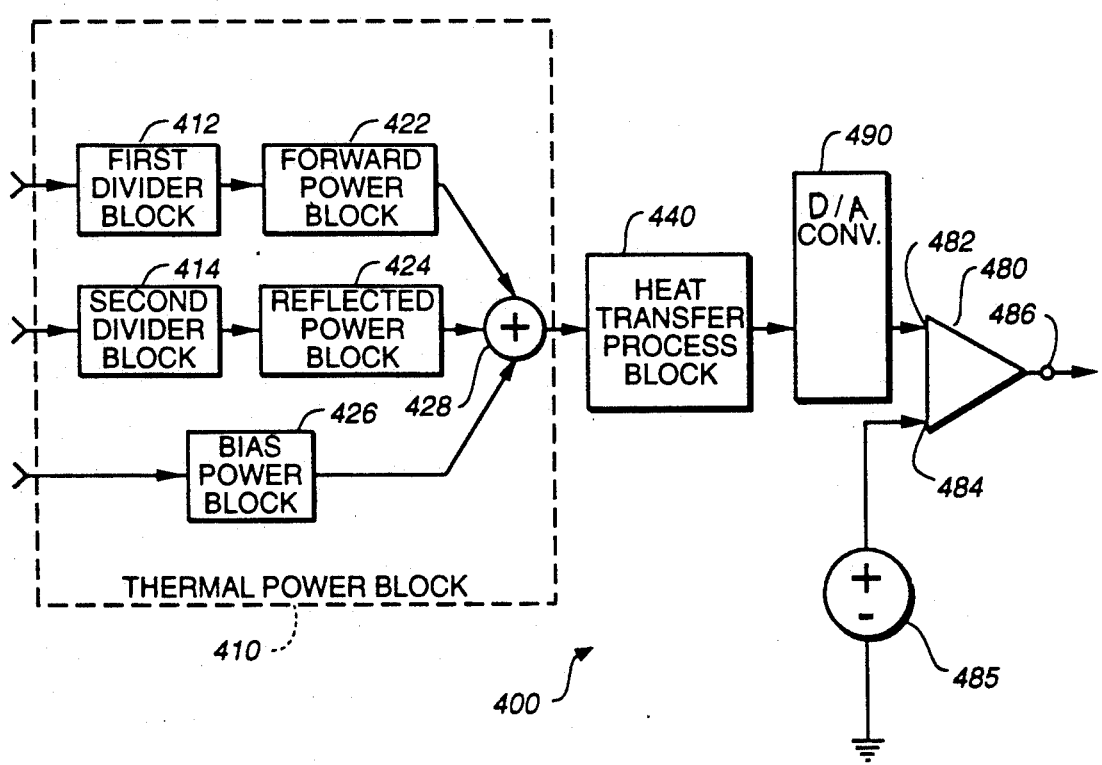
FIG._7

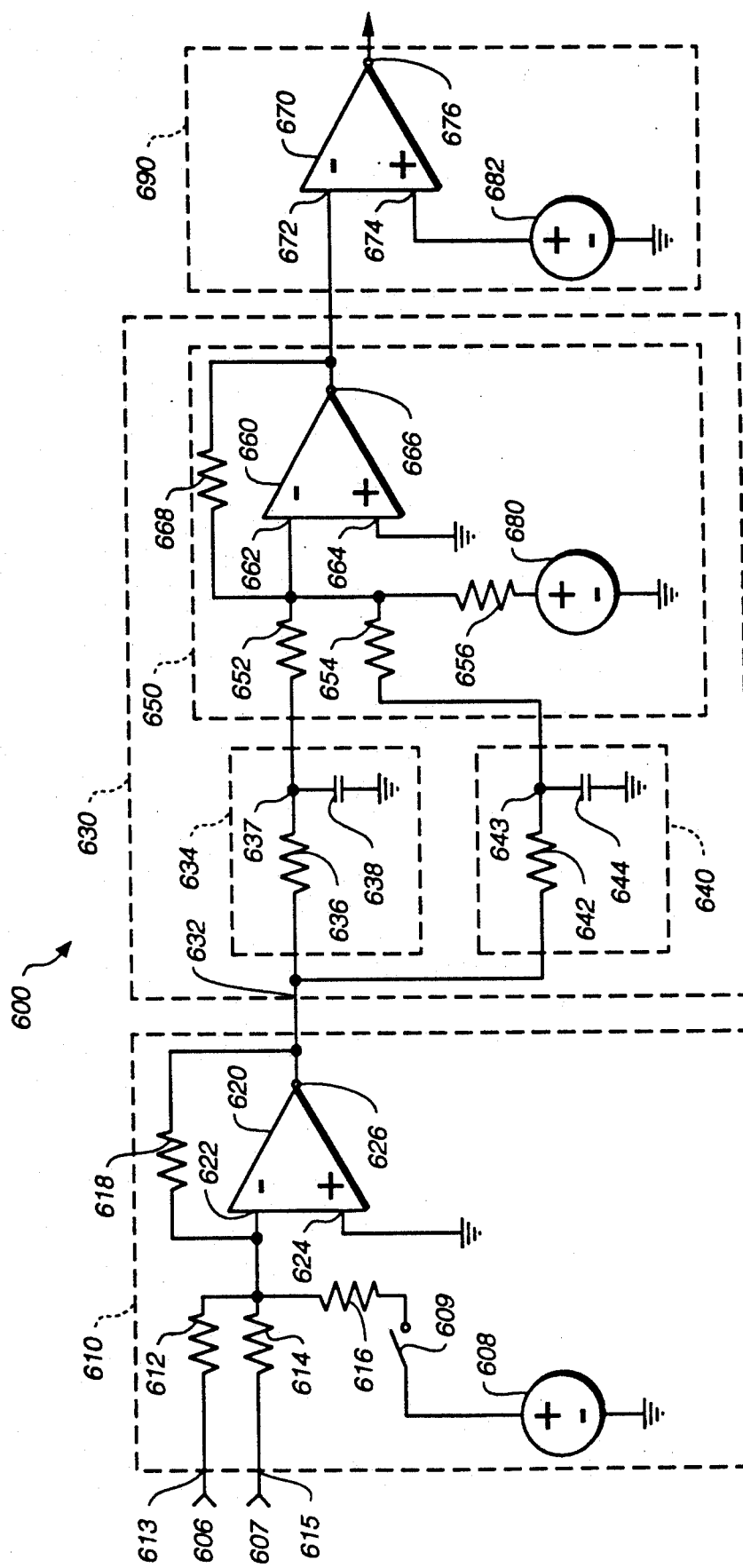
FIG._6

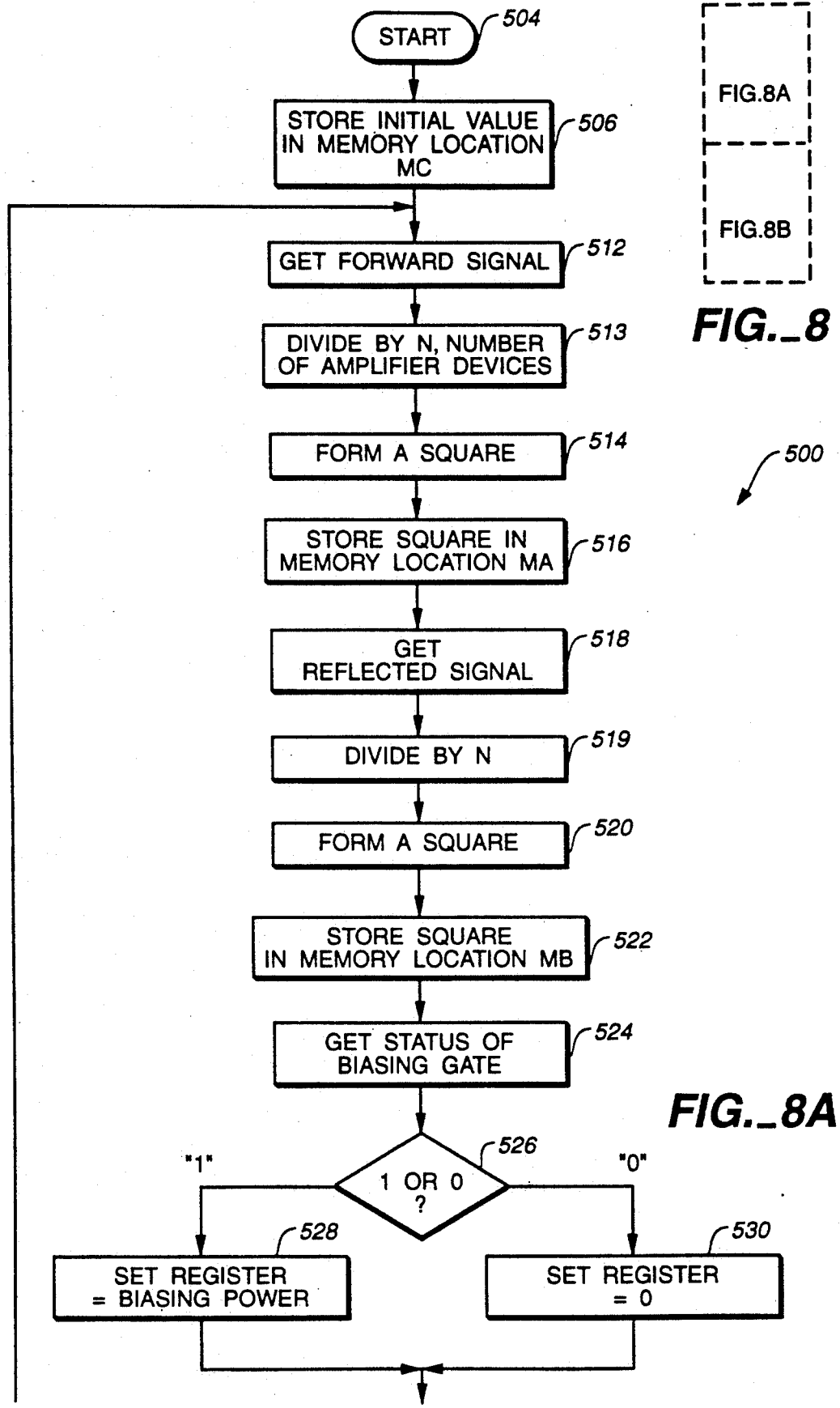
FIG._8
FIG._8A

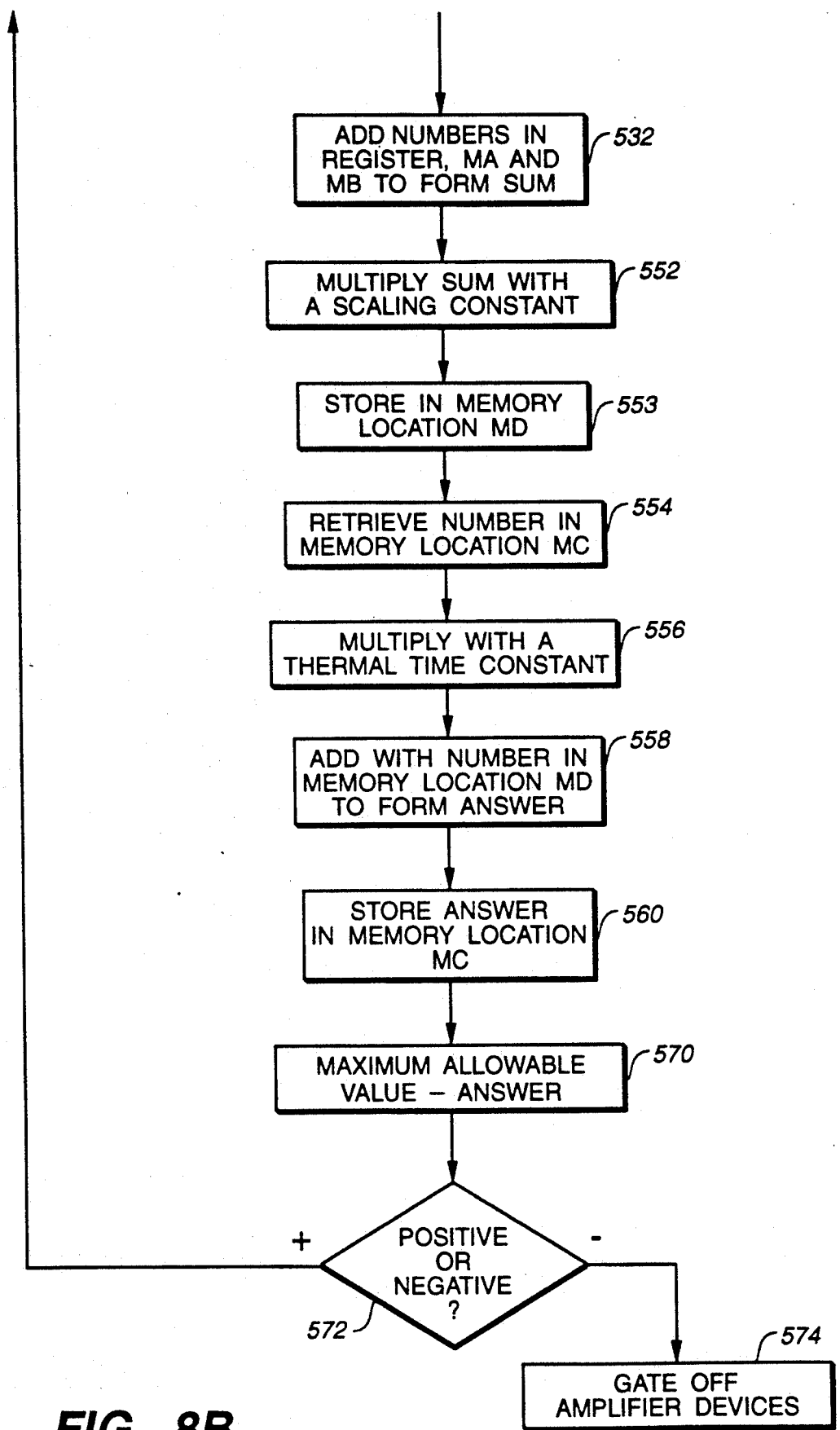
FIG._8B

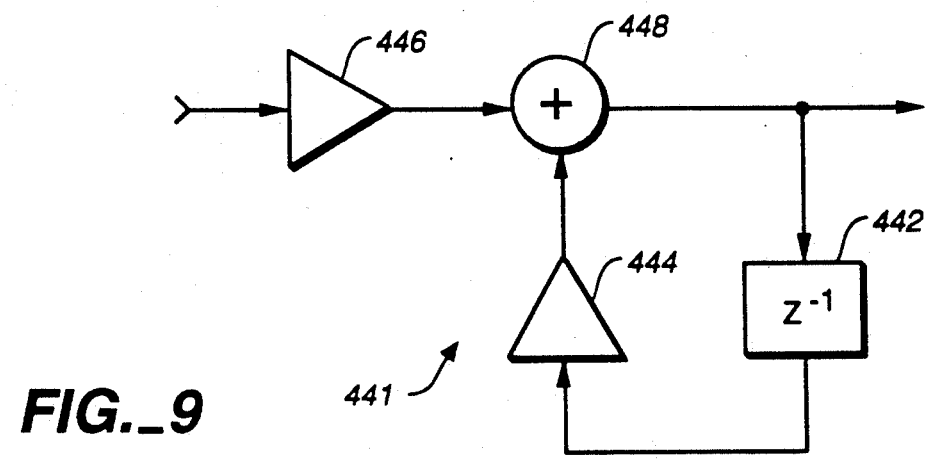
FIG._9
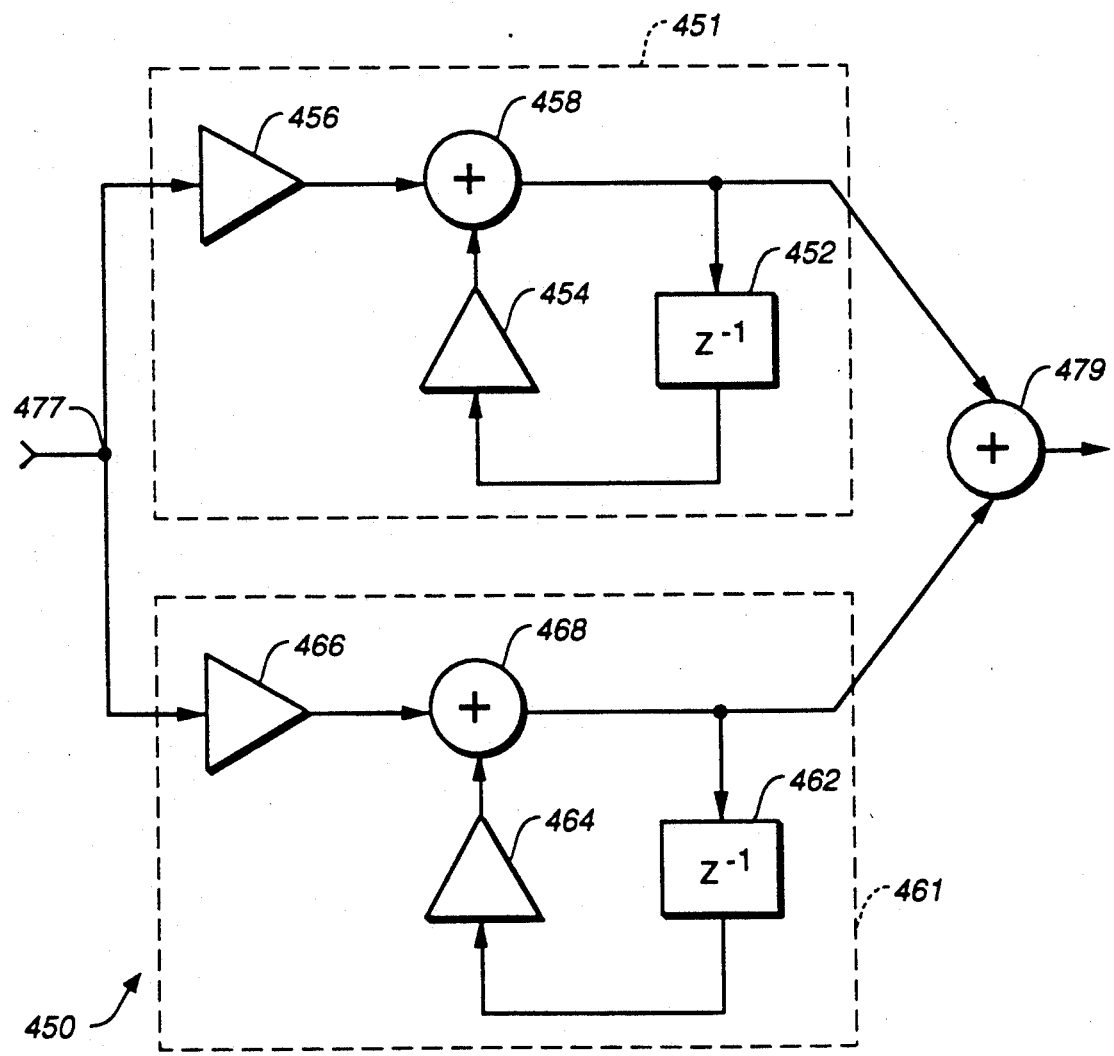
FIG._10

METHOD AND APPARATUS FOR MAINTAINING AN ACTIVE DEVICE BELOW A MAXIMUM SAFE OPERATING TEMPERATURE

FIELD OF THE INVENTION

The present invention relates to the protection of an active device in a semiconductor device. More particularly, the present invention relates to the protection from thermal breakdown of an active device used in a semiconductor device.

BACKGROUND OF THE INVENTION

One of the major problems in the design of a semiconductor device such as power amplifiers is the protection of the semiconductor active devices in the power amplifier from overheating. An active device such as a transistor is not 100% efficient in utilizing electrical energy. As a result, some of the electrical energy in the active device is converted into thermal energy. The generation of thermal energy results in a rise in the junction temperature of the active device. If the thermal energy generated by the active device is not transferred away from the active device, the junction temperature of the active device will eventually rise above a safe operating temperature range. As is well known in the art, the performance of a semiconductor active device deteriorates when the junction temperature exceeds a certain level. In addition, if the junction temperature deviation from the safe operating temperature range is too large, the active device could be permanently destroyed.

Heat generated by an active device is transferred to the ambient through the device's outer enclosure or case. The rate of heat transfer is proportional to the surface area of the case. However, the surface area of the case is generally small. Thus, where heat dissipation is of concern a heat sink is typically attached to the active device to increase the rate of heat transfer from the active device to the ambient.

Although the use of a properly designed heat sink generally keeps an active device below the maximum safe operating temperature, in many cases it is still necessary to constantly monitor the temperature of the active device. This is because, for example, the power amplifier might be inadvertently used outside of its specification and thereby drive the active device above the maximum safe operating temperature.

One of the prior art methods designed to prevent an active device from operating above the maximum safe operating temperature is to attach a temperature sensitive device to either the heat sink or the case of the active device. Preventive steps are taken when the temperature measured by the heat sensitive device reaches a predetermined value. An example of such an approach is illustrated in U.S. Pat. No. 4,054,845 issued to Glogolja, et al. which teaches the use of a temperature sensitive switch. The switch is thermally coupled to a transistor. When the temperature detected by the temperature sensitive switch rises above a predetermined value, the temperature sensitive switch causes the gain of the circuit to become essentially zero. Since the transistor no longer amplifies a signal, heat production by the transistor is reduced. Thus, the temperature of the transistor is prevented from rising above the maximum safe operating temperature.

One problem of using the temperature sensitive device is that there is always a delay between the measured temperature and the actual temperature because the temperature sensitive device takes time to warm up to the actual temperature. If there is a pulse with a large amplitude passing through the active device, the junction temperature of the active device would rise above the safe operating temperature before the temperature sensitive device reaches the predetermined temperature. In this case, the active device would be destroyed.

A second problem of using the temperature sensitive device is that the temperature sensed by the device depends on mechanical factors which typically have loose manufacturing tolerance. Examples of such factors are the position of the temperature sensitive device and the amount of physical contact between the temperature sensitive device and the active device. As a result, there is a large variation in the temperatures sensed by the temperature sensing devices in different amplifiers. Thus, to be safe, it is necessary to provide a larger safety margin. This is accomplished by lowering the predetermined temperature at which preventive measures are triggered. The result is that many amplifiers using this method for thermal protection are shut down prematurely, and the amplifiers are not used to their full capacity.

A second prior art method for the thermal protection of an active device is to incorporate the temperature sensitive device inside the active device. An example of this approach is illustrated in U.S. Pat. No 4,903,106 issued to Fukunaga, et al. It teaches the fabrication on the same substrate of an active device and a temperature sensitive device. An example of such a device is the fabrication of an n-channel enhancement field effect transistor as the active device and a bipolar transistor as the temperature sensitive device. Since the two devices are in close proximity with each other, the temperature at the bipolar transistor is essentially the same as the temperature at the field effect transistor. The bipolar transistor is used in a separate thermal protection circuit which utilizes the linear relationship between the base-to-emitter voltage and the temperature. The thermal protection circuit is designed to turn off the field-effect transistor when the base-to-emitter voltage of the bipolar transistor reaches a predetermined value.

One problem with the device taught by Fukunaga, et al. is that only a small number of active devices incorporate such a design. Thus, an engineer who desires to use an active device with a certain characteristic may not be able to find a suitable device which incorporates the design taught by Fukunaga, et al.

Therefore, it is an object of the present invention to maintain the junction temperature of an active device below the maximum safe operating temperature while allowing optimal use of the active device.

It is another object of the present invention to reduce the time lag between the rise in the junction temperature of the active device and the preventive measures that need to be taken to prevent an active device from rising above the safe operating temperature range.

It is a further object of the present invention to protect a large variety of active devices from rising above the maximum safe operating temperature.

These and other objects, features and advantages of the present invention will become apparent to those skilled in the art from the following detailed description of the invention in conjunction with the accompanying drawings.

SUMMARY OF THE INVENTION

Broadly stated, the present invention consists of an apparatus for preventing the temperature of an active device in a semiconductor device from rising above a safe operating temperature range. The apparatus comprises means for generating an electrical signal representative of the power being coupled through the active device; means for generating a signal representative of the estimated thermal power generated by the active device as a function of the electrical signal; means for generating a signal representative of the estimated temperature of the active device as a function of the signal representative of the estimated thermal power; and means for preventing the active device from operating when the value representative of the estimated temperature of said active device exceeds a predetermined value.

The present invention also consists of a method for preventing the temperature of an active device from rising above its maximum safe operating temperature. In a semiconductor device having at least one active device, an electrical signal representative of the power being coupled through said active device is generated. The electrical signal is converted into a digital value. A value representative of the estimated thermal power as a function of the digital value is generated. A value representative of the estimated temperature as a function of the value representative of the estimated thermal power is generated at a predetermined rate. The value representative of the estimated temperature is converted into an analog voltage, and said active device is prevented from operating when the analog voltage exceeds a predetermined value.

BRIEF DESCRIPTION OF THE DRAWINGS

FIG. 1 is a block diagram of a semiconductor device according to the present invention.

FIG. 2 is a block diagram of a power amplifier according to the present invention.

FIG. 3 is the schematic diagram of a push-pull amplifier stage according to the present invention.

FIG. 4 is the schematic diagram of an output module according to the present invention.

FIG. 5 is the block diagram of a control unit according to the present invention.

FIG. 6 is a schematic diagram of an analog implementation of a control unit according to the present invention.

FIG. 7 is a block diagram of a digital implementation of a control unit according to the present invention.

FIG. 8 (comprising FIGS. 8A and 8B) is a flow chart of an exemplary implementation of a thermal power block and a heat transfer process block according to the present invention using a digital signal processor.

FIG. 9 is a first embodiment of the heat transfer processing block according to the present invention.

FIG. 10 is a second embodiment of a heat transfer processing block according to the present invention.

DESCRIPTION OF THE PREFERRED EMBODIMENT

A block diagram of a semiconductor device in the form of a power amplifier including an apparatus for preventing an active device from rising above a safe operating temperature range according to the present invention is shown at 1000 in FIG. 1. Semiconductor device 1000 comprises a power amplifier 1005 and a control unit 1045. In turn, power amplifier 1005 comprises a power amplifier module 1010 and an output module 1030 and control unit 1045 comprises a thermal power block 1050, a heat transfer process block 1070, and a temperature comparison block 1090.

Power amplifier module 1010 has one or more active devices for amplifying an input signal 108 at an input port 1012. Output module 1030 couples the amplified signal from power amplifier module 1010 to external loads through port 1092. Output module 1030 further comprises means for generating at least one electrical signal representative of the power being coupled through the power amplifier. Thermal power block 1050 comprises means for generating at least one signal representative of the thermal power generated by the active devices as a function of the electrical signal generated in output module 1030. Heat transfer process block 1070 comprises means for generating at least one signal representative of the estimated junction temperature of the active devices inside power amplifier module 1010 by taking into account the thermal power generation as determined by thermal power block 1050 and the heat transfer characteristics of the active devices. The means for preventing the active device from operating comprises temperature comparison block 1090 which generates signals to indicate that the junction temperature of the active devices as determined by heat transfer process block 1070 exceeds a first predetermined value. These signals are used to switch off the active devices to prevent them from operating. The active devices could operate again when the junction temperature as determined by heat transfer process block 1070 is less than a second predetermined value.

Input signal 108 is coupled to power amplifier module 1010 through input port 1012. The input signal is amplified by power amplifier module 1010, and the amplified signal is coupled out of power amplifier module 1010 through an output port 1014 to an input port 1032 of output module 1030. Output port 1034 of output module 1030 is electrically coupled to an output connector 1092 which allows electrical connections between the semiconductor device 1000 and external loads. Output module 1030 also generates electrical signals which are relevant to the estimation of the junction temperature of the active devices. These electrical signals are coupled out of output module 1030 through one or more output ports 1036, 1038, . . . , 1040 to a corresponding one or more input ports 1052, 1054, . . . , 1056, respectively of thermal power block 1050.

In addition to input signals from output module 1030, electrical signals from one or more output ports 1016, 1018, . . . , 1020 of power amplifier module 1010 are also coupled to a corresponding one or more input ports 1064, 1066, . . . , 1068, respectively, of thermal power block 1050. Thermal power block 1050 determines the thermal power generation by each active device based on the electrical signals from output module 1030 and power amplifier module 1010. One or more signals representative of the thermal power of the active devices is coupled out of output ports 1058, 1060, . . . , 1062 of thermal power block 1050 to a corresponding one or more input ports 1072, 1074, . . . , 1076, respectively, of heat transfer process block 1070.

Heat transfer process block 1070 determines the estimated junction temperatures of the active devices by taking into account the thermal energy generation based on the signals from thermal power block 1050 and the heat transfer characteristics of the active devices.

Electrical signals proportional to the estimated junction temperature of the active devices are coupled out of thermal process block 1070 through one or more output ports 1084, 1085, ..., 1086 to a corresponding one or more input ports 1087, 1088, ..., 1089, respectively, of temperature comparison block 1090. These signals are used by temperature comparison block 1090 to generate signals which are coupled out of temperature comparison block 1090 through one or more output ports 1078, 1080, ..., 1082 to a corresponding one or more input ports 1022, 1024, ..., 1026, respectively, of power amplifier module 1010. These signals are used to identify and switch off the active devices which have junction temperature above a safe operating temperature range.

The blocks in semiconductor device 1000 may be implemented using analog circuit elements. In addition, thermal power block 1050, heat transfer process block 1070, and temperature comparison block 1090 can also be implemented using digital components including digital signal processors. The detailed implementation of each block is discussed below.

FIG. 2 is a block diagram of a power amplifier 100 according to the present invention. Power amplifier 100 comprises two main modules, a power amplifier module 110 and an output module 170. The detailed circuit diagrams of these modules are shown in FIGS. 3 and 4.

Power amplifier module 110 is described first. As is conventionally done in the art, power amplifier module 110 uses a plurality of push-pull amplifier stages 120, 122, ..., 124 to perform power amplification in parallel so that the output of power amplifier module 110 is essentially equal to the sum of the power outputs generated by each amplifier stage. An input signal from a pre-amp 105 is electrically coupled to power amplifier module 110. The design of pre-amp 105 is conventional and is well known in the art. An input splitter 112 is used to split the input signal from pre-amp 105 into a plurality of signals of equal amplitudes. The design of input splitter 112 is also conventional and is well known in the art. In general, the number of signals output by splitter 112 is the same as the number of amplifier stages in power amplifier module 110. Each signal generated by splitter 112 is electrically coupled to one of said push-pull amplifier stages 120, 122, ..., 124. All the push-pull amplifier stages have identical circuit configurations so that the signals generated by input splitter 112 are amplified equally. The output from these amplifier stages 120, 122, ..., 124 are combined by a power combiner 160, described below, to form a combined output which is essentially equal to the sum of the power generated by each amplifier stage.

Although power amplifier module 110 has a plurality of amplifier stages, only one amplifier stage 120 is described in detail since all the amplifier stages preferably have an identical circuit configuration. The schematic diagram of an exemplary embodiment of amplifier stage 120 is shown in FIG. 3. Referring again to FIG. 2, amplifier stage 120 has a push-pull splitter 130 which further splits the signal output by splitter 112 into two signals of equal amplitudes but opposite phases. One of these signals is electrically coupled to a first amplifier element 132, and the other signal is electrically coupled to a second amplifier element 134.

In general, an amplifier element requires a bias voltage so that the amplifier element can operate properly. In amplifier stage 120, a bias voltage source 140 is gated to amplifier element 132 through gate 135. Similarly, a bias voltage source 142 is gated to amplifier element 134 through gate 136. The status of gate 135 is controlled by an input signal through port 144 and the status of gate 136 is controlled by an input signal through port 146. If the gate is closed, the bias voltage source is electrically coupled to the amplifier element and the amplifier element is allowed to operate. If the gate is open, the bias voltage source is prevented from being electrically coupled to the amplifier element, thereby causing the amplifier element to cease operation. In this way, individual amplifier elements in each amplifier stage can be gated on or gated off. For those amplifier elements which do not require a bias voltage to operate properly, gates 135 and 136, bias voltage sources 140 and 142, and ports 144 and 146 can be omitted. The outputs from amplifier elements 132 and 134 are electrically coupled to a push-pull combiner 138. Push-pull combiner 138 combines the two amplified signals from amplifier elements 132 and 134, which have essentially equal amplitudes but opposite phases, into one signal which is essentially equal to the sum of the two amplified signals.

The output of each push-pull amplifier stage 120, 122, ..., 124 is then electrically coupled to power combiner 160. The design of power combiner 160 is conventional and is well known in the art. Since each amplifier stage 120, 122, ..., 124 has the same circuit configuration, each generates an amplified signal which is electrically coupled to power combiner 160. Power combiner 160 combines these amplified signals so that the output from the power combiner 160 is essentially equal to the sum of all the outputs from the amplifier stages. This output is provided as the output signal shown at 162 of power amplifier module 110.

The output from power amplifier module 110 is electrically coupled to output module 170 which comprises a measurement unit 171 and two Analog-to-Digital (A/D) converters 178 and 180. Measuring unit 171 comprises a directional coupler 172 and two detectors 174 and 176. The two A/D converters 178 and 180 are needed if digital representations of the measured values are used in determining the junction temperature of the active devices inside power amplifier 100. The schematic diagram of an exemplary embodiment of output module 170 is shown in FIG. 4.

Referring again to FIG. 2, directional coupler 172 preferably comprises a four-port device having an input port 182, an output port 184, and two sampling ports 186 and 188. Input port 182 couples the signal from power amplifier module 110 into directional coupler 172. Output port 184 couples the signal from directional coupler 172 to an output connector 190. The output connector 190 allows electrical connections between the power amplifier and external loads. A small fraction of the signal coupled through coupler 172 from output port 182 to output port 184 is output at the first sample port 186. First sample port 186 is electrically coupled to detector 174 which generates a detected signal Which corresponds to the peak envelope value of the signal from first sampling port 186. The detector 174 is electrically coupled to a first measurement output port 175. Similarly, a small fraction of the signal coupled through coupler 172 from output port 184 to input port 182 is output at the second sampling port 188. Second sampling port 188 is electrically coupled to detector 176 which generates a detected signal which corresponds to the peak envelope value of the signal from second sampling port 188. Detector 176 is then electrically coupled to a second measurement output port 177.

In general, directional coupler 172 is designed such that most of the power from power amplifier module 110 is directed to output port 184. In contrast, the amplitude of the signals at the two sampling ports 186 and 188 are only a small fraction of the amplitude of the signals at input port 182 and output port 184. The signal at one of the sampling ports is proportional to the square root of the forward power from power amplifier module 110 to the load. The signal at the remaining sampling port is proportional to the square root of the reflected power from the load to power amplifier module 110. In output module 170, the signal at first sampling port 186 is proportional to the square root of the forward power and the signal at second sampling port 188 is proportional to the square root of the reflected power.

If digital representations of the measured signals are required, the signal from first measurement output port 175 is coupled to A/D converter 178 which converts the analog peak envelope value from first measurement output port 175 into a digital value representative thereof. The digital output from A/D converter 178 is coupled to a digital data bus 192. Similarly, the signal from second measurement output port 177 is coupled to A/D converter 180 to obtain a digital value representative of the peak envelope value of the signal thereof. The digital output from A/D converter 180 is coupled to a digital data bus 194. Data bus 192 and data bus 194 are electrically coupled to a system data bus 196. System data bus 196 carries digital data to and from various digital components in the semiconductor device.

In power amplifier 100, shown in FIG. 2, the active devices to be protected are inside amplifier elements 132 and 134. Each active device may comprise a field effect or bipolar transistor, operating either in an amplification or a switching mode, or may comprise any other device subject to thermal runaway or breakdown above a maximum safe operating temperature range. In general, the thermal energy generated by the power devices is a function of three variables. The first variable is the peak envelope value of the forward signal, the second variable is the peak envelope value of the reflected signal, and the third variable is the length of time the power devices are gated on. If an analog representation is needed, the first variable can be obtained from first measurement output port 175, the second variable can be obtained from second measurement output port 177, and the third variable can be obtained by monitoring the status of gates 135 and 136 through ports 144 and 146 in power amplifier module 110.

If a digital representation of the signal is required, the first variable, i.e., the peak envelope value of the forward signal, is obtained from A/D converter 178. The second variable, i.e., the peak envelope value of the reflected signal, is obtained from A/D converter 180. The third variable is obtained by monitoring the status of gates 135 and 136. When a gate is switched on, a logic "1" is generated. When a gate is switched off, a logic "0" is generated. For the case where the active devices do not require a bias voltage to operate, a logic "1" is generated at all times when the active device is operating. In this way, the three variables have digital representations which are processed by digital circuits.

If the thermal energy generated by the active devices depends on the forward signal and not on the reflected signal, only the signal proportional to the forward signal that is output at first sampling port 186 is used. Second sampling port 188 together with its associated detector 176 and A/D converter 180 can then be omitted from output module 170. Similarly, if the thermal energy generated by the active devices depends on the reflected signal and not on the forward signal, only the signal proportional to the reflected signal that is output at second sampling port 188 is used. First sampling port 186 together with its associated detector 174 and A/D converter 178 can then be omitted from output module 170. In addition, it is also possible to measure other electrical signals such as the currents in power amplifier 100 to determine the thermal power generated by the active device.

FIG. 3 is a schematic diagram of a preferred embodiment of one of the push-pull amplifier stages, shown in FIG. 2, e.g. amplifier stage 120. Push-pull amplifier stage 200, as shown in FIG. 3, comprises two amplifier elements 210 and 230, a push-pull splitter 201, a biasing-gating circuit 250, and a push-pull combiner 280. Push-pull splitter 201 comprises three capacitors, 204, 205, and 206, and a transformer 202. Transformer 202 is a center-tapped transformer with a primary winding 207 and a secondary winding 203. The input signal 208 to amplifier stage 200 is electrically coupled to primary winding 207. Secondary winding 203 has its center-tap AC-coupled to ground through a capacitor 204. The input signal is split by transformer 202 into two signals with essentially equal amplitudes but opposite phases. These two signals are electrically coupled to the two amplifier elements 210 and 230 through two capacitors, 205 and 206, respectively.

Amplifier element 210 comprises an amplifier device 211, two capacitors 212 and 214, and three resistors 213, 216 and 218. Amplifier device 211 is shown as an enhancement-mode MOSFET in FIG. 3. However, other semiconductor devices such as a depletion-mode MOSFET and a bipolar transistor can also be used. Amplifier device 211 has a gate terminal 274, a source terminal 271 and a drain terminal 273. The signal from push-pull splitter 201 is electrically coupled to the gate terminal 274 of amplifier device 211 through capacitor 205. Source terminal 271 of amplifier device 211 is electrically coupled to ground. The drain terminal 273 is electrically coupled to a power rail 290 through a series combination of a primary winding 262 of a transformer 268, a resistor 292, and an inductor 294. A series combination of resistor 216 and capacitor 212 is electrically coupled between gate terminal 274 and drain terminal 273 to provide feedback stabilization for amplifier device 211. A series combination of resistor 218 and capacitor 214 is electrically coupled between gate terminal 274 and ground to provide broadband radio frequency termination. Resistor 213 is electrically coupled between gate terminal 274 and ground and provides a DC reference to gate terminal 274 of amplifier device 211.

Similarly, amplifier element 230 comprises an amplifier device 231, two capacitors 232 and 234, and three resistors 233, 236, and 238. Amplifier device 231 comprises an enhancement-mode MOSFET, but other semiconductor devices such as a depletion-mode MOSFET and a bipolar transistor can also be used. Amplifier device 231 has a gate terminal 278, a source terminal 275 and a drain terminal 277. The signal from push-pull splitter 201 is electrically coupled to the gate terminal 278 of amplifier device 231 through capacitor 206. Source terminal 275 of amplifier device 231 is electrically coupled to ground. Drain terminal 277 is electrically coupled to power rail 290 through a series combination of primary winding 262 of transformer 268, resistor 292, and inductor 294. Feedback stabilization for amplifier device 231 is provided by electrically coupling a series combination of capacitor 232 and resistor 236 between gate terminal 278 and drain terminal 277. Broadband radio frequency termination is provided by electrically coupling a series combination of resistor 238 and capacitor 234 between gate terminal 278 and ground. Resistor 233 is electrically coupled between gate terminal 278 and ground and provides a DC reference to gate terminal 278 of amplifier device 231.

Bias-gating circuit 250 provides DC bias voltages to amplifier devices 211 and 231. DC bias to amplifier device 211 is provided by a bias voltage source 229. A gate 228 is inserted between bias voltage source 229 and the amplifier circuit. When bias voltage source 229 is gated on by gate 228, it is electrically coupled to amplifier device 211 through a combination of an inductor 220, a resistor 224 and a capacitor 226. The combination is used to block the AC signals from the amplifier circuit to bias voltage source 229. Similarly, DC bias to amplifier device 231 is provided by electrically coupling gate terminal 278 to a bias voltage source 249 through a gate 248 and a combination of an inductor 240, a resistor 244, and a capacitor 246.

Push-pull combiner 280 comprises transformer 268 and a capacitor 264. Drain terminal 273 of amplifier device 211 and drain terminal 277 of amplifier device 231 are electrically coupled to the opposite ends of primary winding 262 of transformer 268. Primary winding 262 has its center-tap electrically coupled to ground through capacitor 264. Primary winding 262 combines the two outputs from amplifier devices 211 and 231 into one output which is essentially the sum of the two outputs from amplifier devices 211 and 231. This combined output is coupled out of push-pull amplifier stage 200 by secondary winding 266 of transformer 268 at output 296.

Amplifier devices 211 and 231 in amplifier stage 200 in the present embodiment are biased for class AB operation. It may be understood that the invention is also applicable to other kinds of amplifiers and amplifier configurations. Examples of amplifiers where the present invention is applicable are class A, class B, and class C.

FIG. 4 is a schematic diagram of a preferred embodiment of output module 170 shown in FIG. 2. Referring to FIG. 4, output module 300 comprises a directional coupler 310, two detectors 340 and 350, and two A/D converters 348 and 358. The theory and construction of a directional coupler is well known in the art. An example of a directional coupler is described in the U.S. Pat. No. 3,550,042 issued to Werlau entitled "Wide Band Directional Coupler." The configuration of directional coupler 310 in FIG. 4 is one of the many available configurations. It may be understood that other configurations of a directional coupler can also be used in the present invention.

Directional coupler 310 comprises an input port 302, an output port 304, a first sampling port 306, a second sampling port 308, and four transformers, 322, 330, 372, and 380. The turns ratios and physical configurations of the four transformers are preferably substantially the same. Transformer 322 comprises a primary winding 324 and a secondary winding 326. Primary winding 324 has one end electrically coupled to port 302 and the other end electrically coupled to ground. Secondary winding 326 has one end electrically coupled to port 306 and the other end electrically coupled to a secondary winding 332 of transformer 330. Physically, secondary winding 326 comprises a straight conductive wire connecting between secondary winding 332 and port 306. Primary winding 324 comprises a coil having a plurality of turns wound around a toroid, while secondary winding 326 is a straight wire running through the toroid.

Transformer 330 comprises a primary winding 334 and secondary winding 332. Primary winding 334 has one end electrically coupled to port 302 and the other end electrically coupled to a primary winding 384 of transformer 380. Secondary winding 332 has one end electrically coupled to secondary winding 326 of transformer 322 and the other end electrically coupled to ground. The junction of the two secondary windings, 332 and 326, is electrically coupled to a resistor 328. Resistor 328 is for signal termination and is typically 50 ohms. Physically, primary windings 334 and 384 comprise a straight conductive wire connecting between input port 302 and output port 304. Secondary winding 332 comprises a coil having a plurality of turns wound around a toroid, while primary winding 334 is a straight wire running through the toroid.

Similarly, transformer 372 comprises a primary winding 374 and a secondary winding 376. Primary winding 374 has one end electrically coupled to port 304 and the other end electrically coupled to ground. Secondary winding 376 has one end electrically coupled to port 308 and the other end electrically coupled to a secondary winding 382 of transformer 380. Again, secondary winding 376 comprises a straight conductive wire and primary winding 374 comprises a coil having a plurality of turns wound around a toroid, while secondary winding 376 is a straight wire running through the toroid.

Transformer 380 comprises primary winding 384 and secondary winding 382. Primary winding 384 has one end electrically coupled to port 304 and the other end electrically coupled to primary winding 334 of transformer 330. Secondary winding 382 has one end electrically coupled to secondary winding 376 of transformer 372 and the other end electrically coupled to ground. The junction of the two secondary windings, 382 and 376, is electrically coupled to a resistor 378. Resistor 378 is for signal termination and is typically 50 ohms. Again, primary windings 384 and 334 comprise a straight conductive wire and secondary winding 382 comprises a coil having a plurality of turns wound around a toroid, while primary winding 384 is a straight wire running through the toroid.

The input signal is electrically coupled to directional coupler 310 through input port 302. The output signal from direction coupler 310 is electrically coupled to a connector 390 through output port 304. Connector 390 allows electrical connection between the power amplifier and external load. An output signal proportional to the forward signal from input port 302 to output port 304 is coupled out of directional coupler 310 through first sampling port 306. An output signal proportional to the reflected signal from output port 304 to input port 302 is coupled out of directional coupler 310 through second sampling port 308.

First sampling port 306 is electrically coupled to one end of a series combination of resistor 312 and resistor 316. The other end of the series combination is electrically coupled to ground. The series combination functions as a voltage divider. The values of resistors 312 and 316 are chosen such that the signal at node 342 is at an appropriate level for measurement. Similarly, second sampling port 308 is electrically coupled to one end of a series combination of resistor 314 and resistor 318. The other end of the series combination is electrically coupled to ground. The series combination functions as a voltage divider. The values of resistors 314 and 318 are chosen such that the signal at node 352 is at an appropriate level for measurement.

Detector 340 comprises a diode 344 and a capacitor 346. Diode 344 has its anode electrically coupled to node 342 and its cathode coupled to capacitor 346 at node 347. The orientation of diode 344 is such that only the positive half of the signal at node 342 is allowed to pass through the diode 344. The other end of capacitor 346 is electrically coupled to ground. The detected signal of detector 340 is the voltage at node 347 corresponding to the peak envelope value of the voltage at node 342. If a digital representation is not required, the voltage at node 347 is used for the determination of the junction temperature.

The output of detector 340 is electrically coupled to A/D converter 348. The output of A/D converter 348 is electrically coupled to a digital data bus 364. Digital data bus 364 is electrically coupled to a system data bus 366. System data bus 366 couples the digital value from A/D converter 348 to other digital components in the semiconductor device. Since the input signal to A/D converter 348 is proportional to the peak envelope of the forward signal, the output from A/D converter 348 is a digital value proportional to the peak envelope of the forward signal.

Detector 350 comprises a diode 354 and a capacitor 356. Diode 354 has its anode electrically coupled to node 352 and its cathode electrically coupled to capacitor 356. The orientation of diode 354 is such that only the positive half of the signal at node 352 is allowed to pass through the diode 354. The other end of capacitor 356 is electrically coupled to ground. The detected signal of detector 350 is the voltage at node 357 corresponding to the peak envelope value of the voltage at node 352. If a digital representation is not required, the voltage at node 357 is used in the determination of the junction temperature.

The output of detector 350 is electrically coupled to A/D converter 358. The output of A/D converter 358 is electrically coupled to a digital data bus 362. Digital data bus 362 is electrically coupled to system data bus 366. Since the input signal to A/D converter 358 is proportional to the peak envelope of the reflected signal, the output from A/D converter 358 is a digital value proportional to the peak envelope of the reflected signal.

What is described above is the electrical connections between amplifier devices 211, 231, shown in FIG. 3, and the other circuit elements. The thermal characteristic of each of the amplifier devices in the present invention is now described.

The efficiency of the amplifier devices is not 100%. A certain percentage of the electrical energy in the amplifier devices is converted to thermal energy during the amplification of the electrical signals. As was discussed before, the amount of thermal energy produced is generally a function of three variables. When there are electrical signals present at the junctions of the amplifier device, heat is generated at the junctions. The amount of heat generated is a function of the peak envelope value of both the forward signal and the reflected signal. The length of time the amplifier devices are gated on is the third variable. In the amplifier stage 200 of FIG. 3, the two amplifier devices 211 and 231 are biased for class AB operation in the preferred embodiment. As a result, amplifier devices 211 and 231 generate heat when they are gated to bias voltages 229, 249 as a result of DC dissipation even though there is no signal in the amplifier devices. When amplifier devices 211 and 231 are not gated to bias voltage 229, 249, the amplifier devices cease operation and no heat is generated by the amplifier devices. Thus, the length of time the amplifier devices are gated on is another variable of the thermal energy generated by the amplifier devices.

When thermal energy is generated at the junction of an amplifier device, the junction temperature of the amplifier device increases. The increase in junction temperature creates a temperature gradient since the ambient temperature surrounding the amplifier device is lower than the junction temperature. Thus, heat is transferred from the junction through the surrounding materials and eventually to the ambient.

In actual practice, a heat sink is normally attached to the case of the amplifier device to improve the heat transfer from the case to the ambient. Heat transfer from a body to the ambient is proportional to the surface area of the thermal radiator. Thus, the use of a heat sink is a way to increase the effective surface area so that heat can be transferred to the ambient more efficiently. The heat transfer from the case to the heat sink is through conduction, while the heat transfer from the heat sink to the ambient is mainly through convection. However, some of the thermal energy is also transferred from the heat sink to the ambient through conduction and radiation. The heat sink is preferably cooled using forced air or a liquid.

The effect of the heat transfer is such that the junction temperature, as a function of time, can be approximated by a differential equation. The simplest such differential equation is a first order differential equation of the form $$d(T)/dt + a*T = Q/b, \qquad (1)$$

where T is the junction temperature of the amplifier device, a is a coefficient which depends on the heat transfer characteristics of both the amplifier device and the heat sink, b is a proportionality factor which depends on the specific heat of the amplifier device, and Q is the thermal power which is the rate in which thermal energy is being generated by the amplifier device. The initial condition of differential equation (1) is generally the ambient temperature, $T_a$. If a more precise approximation of the heat transfer is required, higher order differential equations may be used.

The ambient temperature generally is not fixed because the amplifier likely will operate in different or changing environments. In addition, the ambient temperature generally increases during the operation of the amplifier because the thermal energy generated by the amplifier devices is transferred to the ambient. However, the amplifier is typically designed such that the ambient temperature must stay below a maximum allowable temperature, typically about 40° C., for the amplifier to operate properly. In the preferred embodiment, the value of $T_a$ used in the determination of the estimated junction temperature is presumed to be at the maximum allowable ambient temperature. If the amplifier device is safe at this maximum allowable ambient temperature, the amplifier device should be safe if the actual ambient temperature is below the maximum allowable ambient temperature. It may be understood that the value of $T_a$ used as the initial condition of equation (1) can be any value in the range between the maximum allowable ambient temperature and the actual ambient temperature.

FIG. 5 shows a block diagram 700 for generating a signal representative of the thermal power generated by one amplifier device. In general, the thermal power generated by each amplifier device in power amplifier module 1010 of FIG. 1 can be represented by a block diagram with configuration similar to block diagram 700. In this case, thermal power block 1050 of FIG. 1, which represents the total thermal power generated by all amplifier devices, would have a plurality of block configurations similar to block diagram 700. However, if all the amplifier devices are essentially identical, thermal power block 1050 reduces to block diagram 700. In this case, the value of each block inside block diagram 700 has a value substantially equal to the product of the number of amplifier devices and the value for one amplifier device.

Since all the amplifier devices in the preferred embodiment are substantially the same, block diagram 700 is now referred to as a thermal power block. Referring to FIG. 5, thermal power block 700 comprises a forward power block 720, a reflected power block 728, a bias power block 736, and a summation block 746. Thermal power block 700 can be implemented using an analog circuit, a computing device such as a digital signal processor (DSP), or hardware logic.

An input signal 712 which is proportional to the forward signal is coupled to forward power block 720 through an input port 722. The output from the output port 724 of forward power block 720 is the thermal power generated by the amplifier device due to the forward signal. An input signal 714 which is proportional to the reflected signal is coupled to reflected power block 728 through an input port 730. The output from the output port 732 of reflected power block 728 is the thermal power generated by the amplifier device due to the reflected signal. An input signal 716 representing the status of the biasing gates is sent to bias power block 736 through input port 738. The output from the output port 740 of bias power block 736 is the thermal power generation due to the biasing of the amplifier device. These thermal powers are then summed by summation block 746. The result of the summation is coupled out of summation block 746 through output port 750.

Forward power block 720 simulates the heat generated by the amplifier device due to the forward signal. This heat generation due to the forward signal is a function of the efficiency of the amplifier device in utilizing the DC power. For class AB and class B operations, the efficiency is substantially proportional to the square root of the electrical power in the forward signal. This electrical power is in turn proportional to the square of the forward signal. Consequently, the efficiency is proportional to the forward signal because the square root operation is canceled by the square operation. Thus, the heat generation due to the forward signal is approximately a linear function of the forward signal.

An amplifier circuit operating in other classes and other types of active devices could have a different dependency of the efficiency on the forward signal. Once the efficiency is known, the heat generation due to the forward signal can be determined. For example, if the efficiency is a constant, the heat generation due to the forward signal is proportional to the square of the forward signal. It may be understood that this invention is not limited by the two functional relationships of the efficiency to the forward signal described above.

Reflected power block 728 generates an estimate of the heat generated by the amplifier device due to the absorbing of the reflected signal by the amplifier device. The heat generation is found to depend on the amount of energy absorbed by other components in the circuit. The exact relationship can be obtained experimentally. For the power amplifier shown above, it is found experimentally that the heat generation can be modeled accurately as a function of the square of the reflected signal. It has also been found experimentally that the heat generation can be modeled accurately by a linear function of the reflected signal, e.g. a function that is proportional to the reflected signal.

FIG. 6 is a schematic diagram of a preferred embodiment of control unit 1045 shown in FIG. 1 using analog devices. Referring to FIG. 6, control unit 600 comprises a thermal power block 610, a heat transfer process block 630, and a temperature comparison block 690. These three blocks inside control unit 600 correspond to thermal power block 1050, heat transfer process block 1070, and temperature comparison block 1090, respectively, inside control unit 1045 in FIG. 1.

Thermal power block 610 is a circuit implementation of thermal power block 700 shown in FIG. 5 wherein the thermal energy generated by the amplifier device is a linear function of both the forward signal and the reflected signal since the power amplifier in the present embodiment operates in class AB. In addition, power is also generated from DC biasing of the amplifier devices. All the amplifier devices are assumed to be identical. Thus, it is possible to use block diagram 700 as shown in FIG. 5 to represent thermal power block 1050 of FIG. 1.

Thermal power block 610 comprises a differential amplifier 620, four resistors 612, 614, 616 and 618, two input ports 613 and 615, and a voltage source 608. An input signal 606 proportional to the forward signal enters thermal process block 610 through input port 613. Input signal 606 can be obtained by electrically coupling input port 613 to node 347 of detector 340, shown in FIG. 4. Resistor 612 has one end electrically coupled to input port 613 and the other end electrically coupled to an inverting input terminal 622 of differential amplifier 620. An input signal 607 proportional to the reflected signal enters thermal process block 610 through input port 615. Input signal 607 can be obtained by electrically coupling input port 615 to node 357 of detector 350, shown in FIG. 4. Resistor 614 has one end electrically coupled to input port 615 and the other end electrically coupled to inverting input terminal 622 of differential amplifier 620. Voltage source 608 has one end electrically coupled to ground and the other end electrically coupled to a switch 609 which switches on or switches off to control electrical coupling between voltage source 608 and resistor 616. The other end of resistor 616 is electrically coupled to inverting input terminal 622 of differential amplifier 620. Resistor 618 has one end electrically coupled to inverting input terminal 622 of differential amplifier 620 and the other end electrically coupled to an output terminal 626 of differential amplifier 620. The noninverting input terminal 624 of differential amplifier 620 is electrically coupled to ground.

The voltage source 608 is used to simulate the heat production due to the biasing of the amplifier device. When the amplifier device is not operating, switch 609 is open. When the amplifier device is operating, switch 609 is closed.

The circuit configuration of differential amplifier 620 together with resistors 612, 614, 616, and 618 comprises a summation circuit, the operation of which is well known in the art. The output voltage at output terminal 626 is substantially proportional to current flowing into inverting input terminal 622. The current is equal to the sum of the three signals, input signal 606, input signal 607, and voltage source 608, divided by the corresponding resistors, 612, 614, 616, respectively. Thus, the output voltage at output terminal 626 is substantially equal to the linear sum of input signal 606, input signal 607, and the voltage at voltage source 608, each signal multiplied by the inverse of the resistance of resistors 612, 614, 616, respectively. Since the thermal power in this embodiment is a linear function of the forward signal, the reflected signal, and the biasing power, the voltage at output terminal 626 of differential amplifier 620 is proportional to the thermal power generated by all the amplifier devices.

The next block in control unit 600, heat transfer process block 630, generates a signal representative of the junction temperature of one amplifier device. Since the voltage at output terminal 626 represents the thermal power generated by all the amplifier devices, it is necessary to determine the thermal power generation by one amplifier device based on the signal at output terminal 626. The measured forward signal from output module 300 of FIG. 4 is the sum total of all the forward signals generated from all the amplifier devices. Since all the amplifier devices are assumed to be the same, the forward signal of each amplifier device is equal to the measured forward signal divided by the total number of amplifier devices. Similarly, the reflected signal at each amplifier device is equal to the measured reflected signal divided by the total number of amplifier device. The value of voltage source 608 is selected to simulate the power generation due to biasing of all the amplifier devices so that the power generation due to the biasing of one amplifier device is equal to the value of voltage source 608 divided by the number of amplifier devices. Thus, the forward signal, reflected signal, and the biasing power are divided by the same number. This division can be performed, for example, by adjusting the value of resistor 618. In this way, the voltage at output terminal 626 represents the total thermal power generated by one amplifier device.

The output voltage at output terminal 626, which represents the thermal power generated by one amplifier device, is electrically coupled to an input port 632 of heat transfer process block 630. Heat transfer process block 630 comprises a summation block 650, a voltage source 680, and two R-C blocks 634 and 640. R-C block 634 is used to simulate the heat transfer characteristic of the amplifier element while R-C block 640 is used to simulate the heat transfer characteristics of the heat sink. If it is not necessary to simulate the heat transfer characteristics of the heat sink, R-C block 640 can be removed from heat transfer process block 630.

R-C block 634 comprises a resistor 636 and a capacitor 638. Resistor 636 is electrically coupled between input port 632 and a node 637. Capacitor 638 has one end electrically coupled to node 637 and the other end electrically coupled to ground. Node 637 is electrically coupled to a resistor 652. The signal at node 637 represents the junction temperature of the amplifier device, assuming that the temperatures of the heat sink and the ambient temperature are equal to zero.

Similarly, R-C block 640 comprises a resistor 642 and a capacitor 644. Resistor 642 is electrically coupled between input port 632 and a node 643. Capacitor 644 has one end electrically coupled to node 643 and the other end coupled to ground. Node 643 is electrically coupled to a resistor 654. The signal at node 643 represents the temperature of the heat sink, assuming that the junction temperature and the ambient temperature are equal to zero.

Summation block 650 comprises a differential amplifier 660 and four resistors 652, 654, 656, and 668, each of the four resistors has one end electrically coupled to an inverting input terminal 662 of differential amplifier 660. The other ends of resistors 652, 654 are electrically coupled to nodes 637, 643, respectively, while the other end of resistor 668 is electrically coupled to an output terminal 666 of differential amplifier 660. A voltage source 680 is electrically coupled between ground and the end of resistor 656 which is away from inverting input terminal 662. The noninverting input terminal 664 of differential amplifier 660 is electrically coupled to ground.

R-C block 634 is a conventional RC circuit with resistance R and capacitance C. The ratio of output voltage to input voltage is given by the following formula:

$$\frac{\text{Output Voltage}}{\text{Input Voltage}} = 1 - \exp(-t/RC). \quad (2)$$

The product of R and C is known as the time constant. Equation (2) is also the solution of the first order differential equation (1). Thus, the solution of equation (1), which describes the heat transfer process, can be simulated using R-C block 640. It is well known in the art that the resistance R and the capacitance C used in the simulation correspond to the thermal resistance and the thermal capacitance of the amplifier device. The values of the thermal resistance and the thermal capacitances for a given amplifier device are generally supplied by the manufacturer of the amplifier device. The product of the thermal resistance and the thermal capacitance is known as the thermal time constant. The values of resistor 636 and capacitor 638 are selected so that the product of the resistance and the capacitance is substantially equal to the product of the thermal resistance and the thermal capacitance. Similarly, the values of resistor 642 and capacitor 644 of R-C block 640 are selected such that the product of the resistance and the capacitance is substantially equal to the product of the thermal resistance and the thermal capacitance of the heat sink.

Voltage source 680 is used to represent the ambient temperature. The voltage of voltage source 680 can either be a constant value equal to the maximum expected ambient temperature or a varying value equal to the output of a thermal sensor which measures the actual ambient temperature. Thus, the sum of the output from R-C block 634, R-C block 640, and 640 and voltage source 680 represent the junction temperature of the amplifier device. The summation is performed by summation block 650. The summation operation of the four resistors, 652, 654, 656, 668, and differential amplifier 660 is similar to the summation operation of the four resistors 612, 614, 616, 618, and differential amplifier 620 in thermal power block 610. Consequently, the details of the operation of summation block 650 is not described.

It may be understood that additional R-C blocks similar to blocks 634 and 640 can be added to heat transfer process block 630 to give a more accurate simulation of the junction temperature. These additional R-C blocks can either be added in parallel or in series with R-C blocks 634 and 640.

Temperature comparison block 690 comprises a comparator 670 and a voltage source 682. The voltage from heat transfer process block 630, which represents the estimated junction temperature, is compared to the voltage of voltage source 682, which represents the maximum allowable junction temperature, to determine whether the amplifier device should be gated off. The output of heat transfer process block 630 is electrically coupled to a first input terminal 672 of comparator 670. A second input 674 of comparator 670 is electrically coupled to voltage source 682. An output terminal 676 of comparator 670 is designed to switch between two levels as a function of the voltages at the two input terminals 672 and 674. When the output voltage heat transfer process block 630 is below the voltage at second input terminal 674 of comparator 670, the output voltage at output terminal 676 of comparator 670 is at a first level. This indicates that the estimated junction temperature as determined by heat transfer process block 630 is below the maximum allowable temperature. However, when the output voltage from heat transfer process block 630 exceeds the voltage at second input terminal 674 of comparator 670, output terminal 676 of comparator 670 switches to a second voltage level. This indicates that the estimated junction temperature as determined by heat transfer process block 630 is above the maximum allowable temperature.

As was mentioned before, voltage source 680, which represents the ambient temperature, can either have a constant value to represent the maximum expected ambient temperature or a varying value to represent the actual measured ambient temperature. In the situation where it is desirable to use the maximum expected ambient temperature, voltage source 680 may be eliminated if the value of voltage source 682 is adjusted downward by an amount equal to the value representative of the maximum expected ambient temperature. By eliminating voltage source 680, the output of summation block 650 is reduced by a value equal to the value representative of the maximum expected ambient temperature. Thus, the input to temperature comparison block 690, which is the same as the output of summation block 650, is reduced by the same value. If voltage source 682 is also reduced by the same value, the output of temperature comparison block 690 will not be affected.

It is sometimes desirable to introduce hysteresis in the switching between the two voltage levels at output terminal 676. The circuits to introduce hysteresis are well known in the art.

The two voltage levels at output terminal 676 can be used to prevent the amplifier device from operating at a temperature above a maximum safe operating temperature. One way to accomplish this objective is to use the voltage levels to control the status of the bias gate. When output terminal 676 is at the first voltage level, the bias gate is caused to be closed, thereby allowing the amplifier device to operate. When output terminal 676 is at the second voltage level, the bias gate is caused to be open, thereby preventing the amplifier device from operating. When the amplifier device ceases operation, no more heat is produced. Another way to accomplish the objective of preventing the amplifier device from operating is to cause power rail 290 of FIG. 3 to be disconnected to the power supply when output terminal 676 is at the second voltage level.

In FIG. 6, it is assumed that the thermal power generated by the amplifier device is a linear function of both the forward signal and the reflected signal. If the thermal power depends on the square of these signals, input signals 606 and 607 need to be squared before coupling to input ports 613, 615, respectively. Circuits to generate the square of a signal are well known in the art. Examples are integrated circuits which can generate the square of a signal are the AD534, manufactured by Analog Devices, and the MPY634, manufactured by Burr-Brown.

FIG. 7 is a block diagram of a preferred embodiment of control unit 1045 shown in FIG. 1. Referring to FIG. 7, control unit 400 comprises a thermal power block 410, a heat transfer process block 440, a Digital-to-Analog-converter (D/A) 490, a reference voltage 485, and a comparator 480. Both thermal power block 410 and heat transfer process block 440 can be implemented using hardware logic or a digital signal processor (DSP). If the speed of monitoring the junction temperature is the major concern and the accuracy is not critical, a hardware logic implementation is preferable. Otherwise, the use of a DSP is preferred. An example of a suitable DSP is the DSP56001 manufactured by Motorola. A flow chart for the implementation of an exemplary thermal power block 410 and an exemplary heat transfer process block 440 using a DSP is shown at 500 in FIG. 8.

Referring now to FIG. 7, the digitized peak envelope value of the forward signal output onto system data bus 196 from output module 170 of FIG. 2 is coupled to a first divider block 412. First divider block 412 divides the digitized peak envelope value of the forward signal by the number of amplifier devices in the power amplifier. This is because the forward signal from the output module 170 is the sum of the signals generated by all the amplifier devices. Since thermal power block 410 calculates the thermal process in only one amplifier device, the forward signal needs to be divided to obtain the signal generated by one amplifier device. The output number from first divider block 412 is coupled to a forward power block 422. This block, in a predetermined manner, generates from the incoming digital value an output digital value that is representative of the estimated thermal power generated by the amplifier device as a function of the forward signal. Thus, this block implements the conversion of the forward signal by the amplifier device into a thermal power value. The details of the implementation of forward power block 422 are discussed below.

Similarly, the digitized peak envelope value of the reflected signal output on system data bus 196 from output module 170 of FIG. 2 is coupled to a second divider block 414 which divides the digitized peak envelope value by the number of amplifier devices. The output number from second divider block 414 is coupled to a reflected power block 424. This block, in a predetermined manner, generates from the incoming digital value an output digital value that is representative of the estimated thermal power generated by the amplifier device as a function of the reflected signal.

Thus, this block implements the conversion of the reflected signal by the amplifier device into a thermal power value. The details of the implementation of reflected power block 424 are discussed below.

The on/off status of the bias gating of the amplifier device is sent to a bias power block 426. A digital number "1" is coupled to the bias power block 426 when the amplifier device is gated on and a digital number "0" is coupled to the bias power block 426 when the amplifier device is gated off. Bias power block 426 generates a value representative of the estimated thermal power produced by the amplifier device due to the on-time of the amplifier device. The amount of power generated by the amplifier device when it is biased on is essentially constant. Thus, bias power block 426 multiplies the input digital number, which can be either a "0" or a "1", by an appropriate constant corresponding to the estimated thermal power generated when the amplified device is biased on.

The digital outputs from forward power block 422, reflected power block 424, and bias power block 426 are then summed together at a summation block 428. Thus, the digital output from summation block 428 comprises a digital value that is representative of the estimated total thermal power generated by the amplifier device. The generation of a digital value representative of the estimated heat transfer from the amplifier device to the ambient is performed by a heat transfer process block 440. The digital output from heat transfer process block 440 represents an estimate of the junction temperature of the amplifier device as determined by thermal process block 410, assuming an initial value which is preferably the maximum allowable ambient temperature.

The digital output of heat transfer process block 440 is sent to a D/A converter 490 which converts the value output from heat transfer block 440 into a voltage which is proportional to the estimated junction temperature as determined by thermal process block 410. The output of D/A converter 490 is then coupled to a first input 482 of a comparator 480. A second input 484 of comparator 480 is electrically coupled to a reference voltage 485 which corresponds to the maximum junction temperature allowable in the amplifier device. An output terminal 486 of comparator 480 is designed to switch between two levels as a function of inputs 482, 484. When the output voltage from D/A converter 490 is below the voltage at second input 484 of comparator 480, the output voltage of comparator 480 is at a first level. This indicates that the estimated junction temperature as determined by heat transfer process block 440 is below the maximum allowable temperature. However, when the output voltage from D/A converter 490 exceeds the voltage at second input 484 of comparator 480, output terminal 486 of comparator 480 switches to a second voltage level. This indicates that the estimated junction temperature as determined by thermal process block 410 is above the maximum allowable temperature.

The two voltage levels at output terminal 486 can be used to prevent the amplifier device from operating at a temperature above a maximum safe operating temperature. One way to accomplish this objective is to use the voltage levels to control the status of the bias gate. When output terminal 486 is at the first voltage level, the bias gate is caused to be closed, thereby allowing the amplifier device to operate. When output terminal 486 is at the second voltage level, the bias gate is caused to be open, thereby preventing the amplifier device from operating. When the amplifier device ceases operation, no more heat is produced. Another way to accomplish the objective of preventing the amplifier device from operating is to cause power rail 290 of FIG. 3 to be disconnected to the supply supply when output terminal 486 is at the second voltage level.

Although a comparator is used to compare the voltage from D/A converter 490 with reference voltage 485, the comparison can also be performed by a logical device such as a microprocessor. In this case, a digital value corresponding to the maximum allowable junction temperature is stored in the logical device. Whenever the estimated junction temperature digital value exceeds the number corresponding to the maximum allowable junction temperature, a signal is generated which causes the amplifier device to turn off.

The complexity of the heat transfer process block depends on the desired accuracy of the generation of an estimate of the junction temperature. FIG. 9 shows the block diagram of a first embodiment of a heat transfer process block and FIG. 10 shows the block diagram of a second embodiment of a heat transfer process block. The configuration of the block diagram in FIG. 9 is conventional and is discussed in many digital signal processing textbooks. An example of such a textbook is Van Den Enden, et al., *Discrete-Time Signal Processing, An Introduction*, Prentice Hall, 1989.

The heat transfer process block 441 in FIG. 9 comprises a first multiplier block 444, a second multiplier 446, a summation block 448, and a delay block 442. Delay block 442 retrieves the value of the previous iteration and presents it to the next block. The equation which describes a delay block is given by $$y(n) = x(n-1) \tag{3}$$

where n is an integer number designating the number of iteration in a digital calculation; y(n) is the current, i.e., the $n^{th}$, output from the delay block; and x(n−1) is the input which corresponds to a number from the previous, i e., $(n-1)^{th}$, iteration. In the block diagram of FIG. 8, the input to delay block 442 is a number representing the junction temperature as determined by heat transfer process block 441. Thus, the output of the delay block 442 is a number corresponding to the estimate of the junction temperature from a previous iteration.

In operation of the heat transfer block 441, multiplier Block 444 first multiplies the input digital number by a first multiplication constant. Since first multiplier 444 is connected to delay block 442, the output of first multiplier block 444 is equal to the product of the first multiplication constant and the junction temperature from the previous iteration. Second multiplier block 446 multiplies the digital number from summation block 428 shown in FIG. 7, i.e., the thermal power, by a second multiplication constant. The digital outputs from both multiplier blocks 446 and 444 are added together by summation block 448. The result from summation block 448 is a digital number which is proportional to the estimated junction temperature.

The equation described by heat transfer process block 441 in FIG. 9 is given by $$T(n) = d^*Q(n) + c^*T(n-1) \tag{4}$$

where T(n) is the junction temperature at the nth iteration, T(n−1) is the junction temperature at the (n−1)th iteration, Q(n) is the thermal power generated by the amplifier device at the $n^{th}$ iteration, the coefficient c is the multiplication constant of first multiplier block 444, and the coefficient d is the multiplication constant of second multiplier block 446.

It is well known in the art that equation (4) is a digital representation of a first order differential equation of the form shown in equation (1). An example of a textbook which describes the relationship between equations (1) and (4) is Bognor, et al., *Introduction to Digital Filtering*, Wiley, 1975. It is well known in the art that coefficient c in equation (4) is a function of the thermal time constant while coefficient d is a scaling factor.

The solution of equation (4) represents the junction temperature of the amplifier device assuming that the ambient temperature is equal to the initial value of equation (4). This initial value is the input to delay block 442 at the first iteration. Since delay block 442 retrieves a previously calculated value, this initial value is necessary for the proper operations of heat transfer process block 441 because there is no previously calculated value during the first iteration. The proper choice of the ambient temperature has been discussed previously and is not repeated here.

It is also possible to set the initial value to zero. In this case, the solution of equation (4) represents the junction temperature of the amplifier device assuming that the ambient temperature is zero. As was discussed before, the signal representative of the solution of equation (4) is then compared with another signal representative of the maximum allowable junction temperature in the temperature comparison block, such as voltage source 485 in FIG. 7. If the signal representative of the maximum allowable junction temperature is also lowered by an amount equal to the ambient temperature, the result of the comparison will not be affected.

The multiplication constants of multiplier blocks 444 and 446 can also be determined experimentally. Many manufacturers supply graphs showing the junction temperature of amplifier devices in response to a thermal power pulse. In order to use the graphs, the digital representation of a pulse is coupled to the input of heat transfer process block 441. The multiplication constants are selected so that the output of heat transfer process block 441 matches the graph of junction temperature corresponding to the amplifier device used.

An exemplary implementation using a DSP of thermal power block 410 and heat transfer process block 440 in FIG. 7 is shown at 500 in FIG. 8. Only the first embodiment of heat transfer process block 440 of FIG. 7 as described by block 441 of FIG. 9 is implemented. In the process shown at 500, it is assumed that the estimate of the thermal power value generated by the amplifier device is a function of the square of the forward signal and the square of the reflected signal. Thus, both forward power block 422 and reflected power block 424 in FIG. 7 are square operators which multiply the digital input by itself.

The flow chart starts at step 504. In step 506, an initial value corresponding to the initial temperature is stored in memory location MC. The DSP gets the peak envelope value representative of the forward signal in step 512 and then divides the peak envelope value by N in step 513, where N is the number of amplifier devices. The result from step 513 is then squared in step 514. In step 516, the result of step 514 is stored in a memory location MA for later use. The number in memory location MA represents an estimate of the thermal power generated by the amplifier device from the forward signal. The DSP next gets the peak envelope value representative of the reflected signal in step 518 and then divide the peak envelope value by N in step 519. The result from step 519 is then squared in step 520. In step 522, the result of step 520 is then stored in a memory location MB for later use. The number in memory location MB represents an estimate of the thermal power generated by the amplifier device from the reflected signal. The DSP then looks at the status of the bias gates in step 524. In step 526, the flow chart branches into one of two paths. If the bias gate is on, the flow chart goes to step 528 which enters a number to the register of the DSP equal to the estimated thermal power generated due to the DC dissipation from biasing. If the bias gate is off, the flow chart goes to step 530 which enter the number zero to the register of the DSP. In step 532, the number in the register is then added with the two numbers previously stored in memory locations MA and MB representing estimates of the thermal power due to the forward and reflected signals. The result is an estimate of the total thermal power generated by the amplifier device.

Steps 552 to 560 are the steps to implement the heat transfer process block 441 of FIG. 9. Referring now to FIG. 8, step 552 takes the result of the total thermal power as determined from steps 512 to 532 and multiplies it with a scaling constant. This constant corresponds to the multiplication constant of multiplier block 446 in FIG. 9. In step 553, the result of the multiplication is stored in a memory location MD. In step 554, the DSP retrieves from a memory location MC a number representing the estimated junction temperature calculated in a previous iteration. In the first iteration, this number is the initial value stored in memory location MC in step 506. After the first iteration, this number is the value stored in memory location MC in a later step, step 560, during the previous iteration. In step 556, the DSP multiplies the retrieved number with the thermal time constant of the amplifier device. In step 558, the result of step 556 is added to the number stored in memory location MD. The sum is a number representing the estimated junction temperature calculated in the current iteration. In step 560, this sum is stored in memory location MC to be used in the next iteration.

Steps 570 to 574 is a digital implementation of a temperature comparison block. Step 570 calculates the difference between a maximum allowable value representative of the maximum safe operating temperature and the sum calculated in step 558 representative of the estimated present junction temperature. The difference is used in step 572 to determine the direction of the next step. If the difference is positive indicating that the estimated present junction temperature is below the maximum allowable value, the DSP branches to step 512. As a result, the DSP updates the estimated junction temperature by going through steps 512 to 560. If the difference is negative indicating that the estimated present junction temperature exceeds the maximum allowable value, the DSP sends a signal to gate off the amplifier devices in step 574.

FIG. 10 shows a second embodiment of the heat transfer process block. The heat transfer process block 450 of FIG. 10 comprises two blocks 451 and 461. Each of the blocks has the same configuration as the heat transfer process block of FIG. 9. Thus, the flow chart to implement each of the blocks 451 and 461 is the same as steps 552 to 560 of FIG. 8.

The digital output of summation block 428 shown in FIG. 7, which represents an estimate of the thermal power generated by the amplifier device, is coupled to node 477 of FIG. 10 Node 477 is coupled to a first multiplier block 456 with a first multiplication constant. The output of first multiplier block 456 is equal to the product of the first multiplication constant of first multiplier block 456 and the input number to first multiplier block 456. A first delay block 452 takes the previous calculated digital number and sends it to a second multiplier block 454 which has a second multiplication constant. The output numbers of second multiplication block 454 and first multiplier block 456 are added together at a first summation block 458. The output number from first summation block 458 is sent to a summation block 479.

Likewise, node 477 is coupled to third multiplier block 466. The output of third multiplier block 466 is equal to the product of the third multiplication constant of third multiplier block 466 and the input number at node 477. A second delay block 462 takes the previous calculated digital number and sends it to a fourth multiplier block 464 with a fourth multiplication constant. The output numbers of fourth multiplication block 464 and third multiplier block 466 are added together at a second summation block 468. The output number from second summation block 468 is sent to summation block 479. The output of summation block 479 represents the junction temperature of the amplifier device as determined by heat transfer process block of FIG. 10.

The initial values of the two delay blocks, 452 and 462, are preferably be zero. In this case, the value from the output of summation block 479 represents the estimated junction temperature assuming a zero ambient temperature. In order to compensate for this selection of initial values, the voltage representative of the maximum allowable junction temperature in the temperature comparison block is lower by an amount equal to the ambient temperature.

In the block diagram of FIG. 10, one of the two blocks, 451 and 461, is essentially used to calculate the heat transfer of the amplifier device while the remaining block is essentially used to calculate the heat transfer of the heat sink attached to the amplifier device. Ideally, all the calculations are performed at the same sampling rate, which should be at least two times the highest frequency component present in the system. However, if it is necessary to reduce the amount of computations so as to increase the response time of the DSP, it is possible to reduce the sampling rate of the block which corresponds to the heat transfer by the heat sink. This is because the temperature of the heat sink typically varies in a very slow manner while the temperature of the amplifier device varies much faster. Typically, the difference in the time constants between the heat sink and the amplifier device is more than three orders of magnitude. However, the reduction in the sampling rate may lead to extremely small multiplication constants. In order to change the multiplication constants to more convenient values, digital signal processing techniques such as anti-aliasing can be used. These techniques are well known in the art.

It is of course understood that although the preferred embodiment of the present invention has been illustrated and described, various modifications, alternatives and equivalents thereof will become apparent to those skilled in the art, and accordingly, the scope of the present invention should be defined only by the appended claims.

What is claimed is:

1. In a semiconductor device including an active device for generating a forward signal, a portion of said forward signal being reflected by a load back to said active device so as to comprise a reflected signal, said active device generating thermal power as a function of its operation, said active device having a thermal time constant as a function of its thermal resistance and thermal capacitance, said active device further comprising means for receiving an inhibition signal indicating that said active device is to cease operating, an apparatus for preventing said active device from rising above a safe operating temperature range comprising:
   means for generating a first electrical signal, said first electrical signal being a function of said forward signal in said active device;
   means for generating a second electrical signal, said second electrical signal being a function of said reflected signal in said active device;
   means for generating a signal representative of an estimated value of said thermal power generated by said active device, said signal representative of the estimated value of said thermal power being a function of said first and second electrical signals;
   means for generating a signal representative of an estimated present temperature of said active device, said signal representative of an estimated present temperature being a function of said signal representative of the estimated value of said thermal power and said thermal time constant; and
   means for generating and coupling said inhibition signal to said active device when said signal representative of the estimated present temperature of said active device exceeds a predetermined value.

2. The apparatus of claim 1 wherein said signal representative of said estimated value of said thermal power has a digital value and wherein said means for generating said value representative of the estimated present temperature of said active device comprises means for generating at a predetermined periodic rate said value representative of the estimated present temperature of said active device according to the following equation $$T(n)=d^*Q(n)+c^*T(n-1)$$

where Q is the digital value representative of said estimated value of said thermal power, c is a constant which is a function of the thermal time constant of said active device, d is a constant for converting thermal power into temperature, n is an integer designating the iteration number, and T is the value representative of the estimated present temperature of said active device.

3. The apparatus of claim 2 wherein said means for generating at said predetermined periodic rate said value representative of the estimated present temperature of said active device comprises:
   memory means for storing a previous value representative of the estimated present temperature of said active device, said memory means having a predetermined initial value;
   means for retrieving from said memory means the most recent previous value;
   multiplier means for generating a multiplication product of said retrieved value and a multiplication constant, said multiplication constant being a function of the thermal time constant of said active device;
   summation means for generating said value representative of the estimated present temperature of said active device by adding said first multiplication product with a value proportional to the value representative of the thermal power; and means for storing said value representative of the estimated present temperature of said active device to said memory means.

4. The apparatus of claim 2 wherein said means for generating at said predetermined periodic rate said value representative of the estimated present temperature of said active device comprises:
- a first memory means for storing a first summation value, said first memory means having a predetermined initial value;
- a first retrieving means for retrieving from said first memory means the most recent previous first summation value;
- a first multiplier means for generating a first multiplication product between said previous first summation value from said first retrieval means and a first multiplication constant, said first multiplication constant being a function of the thermal time constant of said active device;
- a first summation means for generating a first summation value equal to the sum of said first multiplication product and a value proportional to the value representative of the estimated thermal power;
- means for storing said first summation value in said first memory means;
- a second memory means for storing a second summation value, said second memory means having a predetermined initial value;
- a second retrieving means for retrieving from said second memory means the most recent previous second summation value;
- a second multiplier means for generating a second multiplication product between said previous second summation value from said second retrieving means and a second multiplication constant, said second multiplication constant being a function of the thermal time constant of a heat sink attached to said active device;
- a second summation means for generating a second summation value equal to the sum of said second multiplication product and a value proportional to the value representative of the estimated thermal power;
- means for storing said second summation value in said second memory means; and
- a third summation means for generating the sum of said first summation value and said second summation value, said sum comprises said value representative of the estimated present temperature of said active device.

5. The apparatus of claim 2 wherein said means for preventing said active device from operating comprises:
- a voltage source;
- a comparator having a first input terminal, a second input terminal, and an output terminal;
- means for converting the value representative of the estimated present temperature of said active device into a corresponding analog voltage;
- means for coupling said corresponding analog voltage to said first input terminal of said comparator;
- means for coupling said voltage source to said second input terminal of said comparator, said comparator outputting a first voltage level when the voltage at said first input terminal exceeds the voltage at said second input terminal and for outputting a second voltage level at all other times; and
- means responsive to said first voltage level for causing said active device to cease operation.

6. In a semiconductor device including an active device for generating a forward signal, a portion of said forward signal being reflected by a load back to said active device so as to comprise a reflected signal, said active device generating thermal power as a function of its operation, said active device having a thermal time constant as a function of its thermal resistance and thermal capacitance, said active device further comprising means for receiving an inhibition signal indicating that said active device is to cease operating, an apparatus for preventing said active device from rising above a safe operating temperature range comprising:
- means for generating a first electrical signal, said first electrical signal being a function of said forward signal in said active device;
- means for generating a second electrical signal, said second electrical signal being a function of said reflected signal in said active device;
- means for generating a signal representative of an estimated value of said thermal power generated by said active device, said signal representative of the estimated value of said thermal power being a function of said first and second electrical signals;
- means for generating a signal representative of an estimated present temperature of said active device, said signal representative of an estimated present temperature being a function of said signal representative of the estimated value of said thermal power and said thermal time constant; and
- means for generating and coupling said inhibition signal to said active device when said signal representative of the estimated present temperature of said active device exceeds a predetermined value, wherein said active device generates a first thermal power as a function of said forward signal and a second thermal power as a function of said reflected signal, and wherein said means for generating a signal representative of the estimated value of said thermal power comprises:
- first generation means for generating a signal representative of an estimated value of said first thermal power;
- second generation means for generating a signal representative of an estimated value of said second thermal power; and
- means for summing said signals generated by said first generation means and said second generation means.

7. In a semiconductor device including an active device for generating a forward signal, a portion of said forward signal being reflected by a load back to said active device so as to comprise a reflected signal, said active device generating thermal power as a function of its operation, said active device having a thermal time constant as a function of its thermal resistance and thermal capacitance, said active device further comprising means for receiving an inhibition signal indicating that said active device is to cease operating, an apparatus for preventing said active device from rising above a safe operating temperature range comprising:
- means for generating a first electrical signal, said first electrical signal being a function of said forward signal in said active device;

means for generating a second electrical signal, said second electrical signal being a function of said reflected signal in said active device;

means for generating a signal representative of an estimated value of said thermal power generated by said active device, said signal representative of the estimated value of said thermal power being a function of said first and second electrical signals;

means for generating a signal representative of an estimated present temperature of said active device, said signal representative of an estimated present temperature being a function of said signal representative of the estimated value of said thermal power and said thermal time constant; and means for generating and coupling said inhibition signal to said active device when said signal representative of the estimated present temperature of said active device exceeds a predetermined value, wherein said means for generating a signal representative of the estimated present temperature of said active device comprises:

a resistor having a first end coupled to said signal representative of the estimated thermal power and a second end for outputting said signal representative of the estimated present temperature of said active device; and a capacitor having one end coupled to said second end of said resistor and the other end coupled to ground, the capacitance of said capacitor having a value such that the product of the resistance of said resistor and the capacitance of said capacitor is a function of the product of the thermal resistance and thermal capacitance of said active device.

8. The apparatus of claim 7 wherein said means for preventing said active device from operating comprises:

a voltage source;

a comparator having a first input terminal, a second input terminal, and an output terminal;

means for coupling said signal representative of the estimated present temperature of said active device to said first input terminal of said comparator;

means for coupling said voltage source to said second input terminal of said comparator, said comparator outputting a first voltage level when the voltage at said first input terminal exceeds the voltage at said second input terminal and for outputting a second voltage level at all other times; and means responsive to said first voltage level for turning off said active device.

9. In a semiconductor device including an active device for generating a forward signal, a portion of said forward signal being reflected by a load back to said active device so as to comprise a reflected signal, said active device generating thermal power as a function of its operation, said active device having a thermal time constant as a function of its thermal resistance and thermal capacitance, said active device further comprising means for receiving an inhibition signal indicating that said active device is to cease operating, an apparatus for preventing said active device from rising above a safe operating temperature range comprising:

means for generating a first electrical signal, said first electrical signal being a function of said forward signal in said active device;

means for generating a second electrical signal, said second electrical signal being a function of said reflected signal in said active device;

means for generating a signal representative of an estimated value of said thermal power generated by said active device, said signal representative of the estimated value of said thermal power being a function of said first and second electrical signals;

means for generating a signal representative of an estimated present temperature of said active device, said signal representative of an estimated present temperature being a function of said signal representative of the estimated value of said thermal power and said thermal time constant; and means for generating and coupling said inhibition signal to said active device when said signal representative of the estimated present temperature of said active device exceeds a predetermined value, wherein said means for generating a signal representative of the estimated present temperature of said active device comprises:

a first resistor having a first end coupled to said signal representative of the estimated thermal power and a second end for outputting a first signal;

a first capacitor having one end coupled to said second end of said first resistor and the other end coupled to ground, the capacitance of said first capacitor having a value such that the product of the resistance of said first resistor and the capacitance of said first capacitor is a function of the product of the thermal resistance and thermal capacitance of said active device;

a second resistor having a first end coupled to said signal representative of the estimated thermal power and a second end for outputting a second signal;

a second capacitor having one end coupled to said second end of said second resistor and the other end coupled to ground, the capacitance of said second capacitor having a value such that the product of the resistance of said second resistor and the capacitance of said second capacitor is a function of the product of the thermal resistance and thermal capacitance of a heat sink attached to said active device; and a summation means for generating said signal representative of the estimated present temperature of said active device as the sum of said first signal and said second signal.

10. In a semiconductor device having a plurality of amplifier stages, each said amplifier stage including at least one semiconductor transistor for generating a forward signal, each said transistor having a thermal resistance and a thermal capacitance, said forward signal generated by each said transistor being combined to generate a combined forward signal, a portion of said combined forward signal being reflected by a load as a reflected signal back to said semiconductor device, a portion of said reflected signal being absorbed by each said transistor, each said transistor generating thermal power as a function of said forward signal, said portion of said reflected signal, and a DC bias coupled to said transistor, an apparatus for preventing each said semiconductor transistor from rising above a safe operating temperature range comprising:

a directional coupler for generating a first signal representative of said forward signal in each said transistor and a second signal representative of said portion of said reflected signal in each said transistor;

a first detector for generating a first detected signal of said first signal;

a second detector for generating a second detected signal of said second signal;

a first voltage source having a voltage representative of the thermal power generated by each said transistor due to said DC bias;

a first summation means for generating a signal which is a linear sum of said first detected signal, said second detected signal, and the voltage of said first voltage source;

a resistor having a first end coupled to the signal from said first summation means and a second end for generating an output signal;

a capacitor having a first end coupled to the second end of said resistor and the second end coupled to ground, the capacitance of said capacitor having a value such that the product of the resistance of said resistor and the capacitance of said capacitor being a function of the product of the thermal resistance and thermal capacitance of each said transistor;

a comparator having a first input terminal, a second input terminal, and an output terminal;

a second voltage source having a value representative of the maximum allowable temperature of each said transistor;

means for coupling the second end of said resistor to the first input terminal of said comparator;

means for coupling said second voltage source to the second input terminal of said comparator, said comparator outputting a first voltage level when the voltage at said first input terminal exceeds the voltage at said second input terminal and for outputting a second voltage level at all other times; and means responsive to said first voltage level for preventing each said transistor from operating.

11. In a semiconductor device having a plurality of amplifier stages, each amplifier stage including at least one semiconductor transistor for generating an amplified signal in response to an input signal, said amplified signal generated by each said transistor being combined to generate a forward signal, a portion of said forward signal being reflected by a load back to said semiconductor device as a reflected signal, a portion of said reflected signal being absorbed by each said transistor, each said transistor generating a first thermal power as a function of said forward signal and a second thermal power as a function of said portion of said reflected signal, each said transistor having a thermal time constant, an apparatus for preventing each said semiconductor transistor from rising above a safe operating temperature range comprising:

a directional coupler for generating a first sampled signal representative of said forward signal and a second sampled signal representative of said reflected signal;

a first detector for generating a first peak envelope value of said first sampled signal;

a second detector for generating a second peak envelope value of said second sampled signal;

a first analog-to-digital converter for converting said first peak envelope value to a first digital value;

a second analog-to-digital converter for converting said second peak envelope value to a second digital value;

a first thermal power means for generating a first thermal value representative of an estimated value of said first thermal power [generated by each said transistor] as a function of said first digital value;

a second thermal power means for generating a second thermal value representative of an estimated value of said second thermal power [generated by each said transistor] as a function of said second digital value;

a total thermal power means for generating a total thermal value as the sum of said first and said second thermal values;

means for generating a value representative of an estimated present temperature of each said transistor, said value representative of the estimated present temperature being a function of said total thermal value generated by said total thermal power means and said thermal time constant;

means for converting said value representative of the estimated present temperature of each said transistor into a corresponding analog voltage;

a comparator having a first input terminal, a second input terminal, and an output terminal;

a voltage source;

means for coupling said corresponding analog voltage to the first input terminal of said comparator;

means for coupling said voltage source to the second input terminal of said comparator, said comparator outputting a first voltage level when the voltage at said first input terminal exceeds the voltage at said second input terminal and for outputting a second voltage level at all other times; and means responsive to said first voltage level for preventing each said transistor from operating.

12. The apparatus of claim 11 wherein said means for generating a value representative of the estimated present temperature of each said active device comprises means for generating said value according to the following equation:

$$T(n) = d^*Q(n) + c^*T(n-1)$$

where Q is said total thermal power, c is a constant which is a function of the thermal time constant of each said active device, d is a constant for converting thermal power into temperature, n is an integer designating the iteration number, and T is the value representative of the estimated present temperature of each said active device.

13. In a semiconductor circuit having at least one active device for generating a forward signal, a portion of said forward signal being reflected by a load back to said active device so as to comprise a reflected signal, said active device generating thermal power as a function of its operation, said active device having a thermal time constant, said active device further comprising means for receiving an inhibition signal indicating that said active device is to cease operating, a method for preventing the temperature of said active device from rising above a safe operating temperature range comprises the steps of:

generating a first digital value which is a function of said forward signal in said active device, said first digital value being repetitively generated at a predetermined periodic rate;

generating a second digital value which is a function of said reflected signal in said active device said second digital value being repetitively generated at a predetermined periodic rage;

generating a value representative of an estimated value of said thermal power, said value representative of the estimated value of said thermal power being a function of said first digital value and said second digital value, said value being repetitively generated at a predetermined periodic rate;

generating at a predetermined periodic rate a value representative of an estimated present temperature of said active device, said value representative of the estimated present temperature being a function of the value representative of the estimated value of said thermal power and said thermal time constant;

converting each said value representative of the estimated present temperature of said active device into an analog voltage; and generating and coupling said inhibition signal to said active device when said analog voltage exceeds a predetermined value.

14. The method of claim 12 wherein said step of generating a value representative of the estimated thermal power comprises:

generating a value representative of the estimated thermal power resulting from said forward signal as a function of said first digital value;

generating a value representative of the estimated thermal power resulting from said reflected signal as a function of said second digital value; and summing the value representative of the estimated thermal power resulting from said forward signal and the value representative of the estimated thermal power resulting from said reflected signal.

15. The method of claim 13 wherein said step of generating a value representative of the estimated present temperature of said active device comprises generating said value according to the following equation:

$$T(n) = d*Q(n) + c*T(n-1)$$

where Q is said value representative of said estimated value of the thermal power, c is a constant which is a function of the thermal time constant of said active device, d is a constant for converting thermal power into temperature, n is an integer designating the iteration number, and T is the value representative of the estimated present temperature of said active device.

16. The method of claim 13 wherein said step of generating at a predetermined periodic rate a value representative of the estimated present temperature of said active device comprises the steps of:

storing a predetermined initial value to a memory;

retrieving the most recent previous value from said memory;

multiplying said retrieved value by a multiplication constant to generate a multiplication product, said multiplication constant being a function of the thermal time constant of said active device;

summing said multiplication product and said value representative of the estimated value of said thermal power to generate said value representative of the estimated present temperature of said active device;

storing said value representative of the estimated present temperature of said active device to said memory; and repeating said retrieving step, said multiplying step, said summing step, and said storing step at said predetermined period rate.

17. The method of claim 13 wherein said active device is attached to a heat sink having a thermal time constant and wherein said step of generating at a predetermined periodic rate a value representative of the estimated present temperature of said active device comprises the steps of:

storing a first predetermined initial value to a first memory;

storing a second predetermined initial value to a second memory;

retrieving the most recent previous value from said first memory;

multiplying said retrieved value from said first memory by a first multiplication constant to generate a first multiplication product; said first multiplication constant being a function of the thermal time constant of said active device;

summing said first multiplication product and the value representative of the estimated value of said thermal power to generate a first sum;

storing said first sum to said first memory;

retrieving the most recent previous value from said second memory;

multiplying said retrieved value from said second memory by a second multiplication constant to generate a second multiplication product; said second multiplication constant being a function of the thermal time constant of said heat sink;

summing said second multiplication product and a value proportional to the value representative of the estimated value of said thermal power to generate a second sum;

storing said second sum to said second memory;

summing said first sum and said second sum to generate said value representative of the estimated present temperature of said active device; and repeating said retrieving step to retrieve from said first memory, said multiplication step to generate said first multiplication product, said summing step to generate said first sum, said storing step to said first memory, said retrieving step to retrieve from said second memory, said multiplication step to generate said second multiplication product, said summation step to generate said second sum, said storing step to store to said second memory, an said summation step to generate said value representative of the estimated present temperature of said active device.

* * * * *